United States Patent
Martz et al.

(10) Patent No.: US 11,678,958 B2
(45) Date of Patent: Jun. 20, 2023

(54) FABRICATION OF DENTAL APPLIANCES

(71) Applicant: MARTZ INC., Bakersfield, CA (US)

(72) Inventors: Andrew Martz, Bakersfield, CA (US); Martin Martz, Bakersfield, CA (US)

(73) Assignee: ARCHFORM INC., Bakersfield, CA (US)

( * ) Notice: Subject to any disclaimer, the term of this patent is extended or adjusted under 35 U.S.C. 154(b) by 456 days.

(21) Appl. No.: 16/145,118

(22) Filed: Sep. 27, 2018

(65) Prior Publication Data

US 2019/0090984 A1    Mar. 28, 2019

Related U.S. Application Data

(60) Provisional application No. 62/564,064, filed on Sep. 27, 2017.

(51) Int. Cl.
*A61C 7/08* (2006.01)
*A61C 7/00* (2006.01)
(Continued)

(52) U.S. Cl.
CPC .............. *A61C 7/08* (2013.01); *A61C 7/002* (2013.01); *B29C 64/124* (2017.08); *B33Y 10/00* (2014.12);
(Continued)

(58) Field of Classification Search
CPC ......... B29C 64/10; B29C 64/20; B29C 64/30; B29C 64/40; B29C 64/124; A61C 7/08;
(Continued)

(56) References Cited

U.S. PATENT DOCUMENTS

2006/0154195 A1    7/2006    Mather
2014/0249325 A1*   9/2014    Wolter .................. C08G 77/392
                                                                556/420
(Continued)

FOREIGN PATENT DOCUMENTS

CN    104244862 A    12/2014
CN    107106263 A     8/2017
(Continued)

OTHER PUBLICATIONS

International Search Report of the International Searching Authority dated Nov. 15, 2018, issued in corresponding PCT/US18/53235, 2 pages.
(Continued)

*Primary Examiner* — Nahida Sultana
(74) *Attorney, Agent, or Firm* — Lewis Roca Rothgerber Christie LLP

(57) ABSTRACT

A dental appliance made of an olefin polymer is directly formed via rapid prototyping without the use of an intermediary physical mold. A polymer precursor solution includes one or more olefin-containing monomers and/or oligomers, an olefin polymerization catalyst, and a UV absorbing agent to limit penetration of the UV light through the polymer precursor solution. One or more reactions of the polymer precursor solution are modulated in response to UV light, and the polymer precursor solution may further include an inhibitor (quenching agent) configured to modulate those reactions. The polymer precursor solution can be deposited using UV-cured stereolithographic or 3D printing methods to form appliances exhibiting improved elongation at break characteristics and suitable stress resistance.

3 Claims, 18 Drawing Sheets

(51) Int. Cl.
  *B29C 64/124* (2017.01)
  *B33Y 70/00* (2020.01)
  *B33Y 80/00* (2015.01)
  *B33Y 10/00* (2015.01)
  *B29L 31/00* (2006.01)
  *A61C 13/00* (2006.01)

(52) U.S. Cl.
  CPC ............... *B33Y 70/00* (2014.12); *B33Y 80/00* (2014.12); *A61C 13/0019* (2013.01); *B29L 2031/7532* (2013.01)

(58) Field of Classification Search
  CPC ..... A61C 7/002; A61C 13/0019; B33Y 70/00; B33Y 80/00; B33Y 10/00; B29L 2031/7532
  See application file for complete search history.

(56) References Cited

U.S. PATENT DOCUMENTS

| | | | |
|---|---|---|---|
| 2014/0370318 A1* | 12/2014 | Stephen | C08K 5/05 428/523 |
| 2015/0025199 A1 | 1/2015 | Obrecht et al. | |
| 2015/0118188 A1 | 4/2015 | Weitekamp et al. | |
| 2015/0374464 A1 | 12/2015 | Stewart | |
| 2016/0185897 A1* | 6/2016 | Stephen | C08G 61/08 526/171 |
| 2016/0376263 A1* | 12/2016 | Patron | C07D 413/14 514/784 |
| 2017/0007359 A1 | 1/2017 | Kopelman et al. | |
| 2017/0007362 A1 | 1/2017 | Chen et al. | |
| 2017/0065373 A1 | 3/2017 | Martz et al. | |
| 2017/0087199 A1* | 3/2017 | Patron | A61K 36/67 |
| 2019/0090984 A1 | 3/2019 | Martz et al. | |
| 2019/0159871 A1 | 5/2019 | Chan et al. | |
| 2021/0163676 A1* | 6/2021 | Balasubramanian | B33Y 70/00 |

FOREIGN PATENT DOCUMENTS

| | | | |
|---|---|---|---|
| CN | 110087578 A | 8/2019 | |
| EP | 2676633 A1 | 12/2013 | |
| JP | 2004-81837 A | 3/2004 | |
| JP | 2006-503171 A | 1/2006 | |
| JP | 2014-133134 A | 7/2014 | |
| JP | 2015-501207 A | 1/2015 | |
| JP | 2016-140702 A | 8/2016 | |
| WO | WO 2004/033553 A1 | 4/2004 | |
| WO | WO 2013/130552 A1 | 9/2013 | |
| WO | WO 2014/055720 A1 | 4/2014 | |
| WO | WO2016036976 A1 | 3/2016 | |
| WO | WO 2016/063282 A1 | 4/2016 | |
| WO | WO 2016/075528 A1 | 5/2016 | |
| WO | WO 2017/127569 A1 | 7/2017 | |
| WO | WO 2019/067794 A1 | 4/2019 | |

OTHER PUBLICATIONS

Written Opinion of the International Searching Authority dated Nov. 15, 2018, issued in corresponding PCT/US18/53235, 5 pages.
Korean Office action for corresponding Korean Application No. 10-2020-7011625, dated Aug. 13, 2021, 7 pages, and English translation, 10 pages.
Extended European Search Report for Application No. EP 18 86 1349, dated Jun. 23, 2021, 10 pages.
Australian Examination Report for Application No. 2018338636, dated Aug. 7, 2020, 5 pages.
Chinese Office action for Application No. 201880076647.9, dated Apr. 19, 2021 and English translation, 14 pages.
Canadian Office action for Application No. 3,077,237, dated Apr. 14, 2021, 3 pages.
Japanese Office action for Application No. 202-518697, dated Apr. 27, 2021, and English translation, 11 pages.
Official Letter and Search Report for corresponding Taiwan Patent Application No. 107134140, dated Dec. 7, 2021, and English Translation, 16 pages.
Japanese Office Action for corresponding Japanese Patent Application No. 2020-518697, dated Mar. 8, 2022, 5 pages and English translation, 6 pages.
Examination Report for corresponding Australian Patent Application No. 2021209327, dated May 6, 2022, 5 pages.
Chinese Office action for corresponding Chinese Patent Application No. 201880076647.9, dated Jan. 5, 2022, 8 pages and English translation, 4 pages.
Singh, G. Dave et al., "Customized mandibular orthotics in the prevention of concussion/mild traumatic brain injury in football players: a preliminary study," Dental Traumatology, 2009; 25: 515-521.
Strahlendorf, Jean et al., "Unilateral or 'Side-Locked' Migraine Headache With Autonomic Symptoms Linked to Night Guard Use": A Response, and Dorrow, Stanley, "The Use of Intraoral Orthotics," Headache: The Journal of Head and Face Pain, Apr. 2009, pp. 613-614.
Wang, JunHuan, et al., "Measurement of correction forces of orthodontic appliances made of two different materials and comparative analysis on it," Chin J. Otorhinolaryngol Integ Med 2015. vol. 23, No. 5, pp. 379-381, including English Abstract.
KIPO Notification of Reason for Refusal for Application No. KR 10-2020-7011625, dated Jun. 20, 2022 (6 pages) and English Translation (8 pages).
Chinese Decision of Rejection for Application No. CN 201880076647. 9, dated Jul. 1, 2022, 5 pages.

* cited by examiner

FABRICATION OF DENTAL APPLIANCES

CROSS-REFERENCE TO RELATED APPLICATION(S)

This application claims priority to and the benefit of U.S. Provisional Application No. 62/564,064, filed Sep. 27, 2017 and titled "FABRICATION OF DENTAL APPLIANCES", the entire content of which is incorporated herein by reference. This application is also related to U.S. patent application Ser. No. 15/260,026, filed Sep. 8, 2016 and titled TOOTH-POSITIONING APPLIANCE, SYSTEMS AND METHODS OF PRODUCING AND USING THE SAME, the entire content of which is incorporated herein by reference.

BACKGROUND

Therapeutic dental appliances may be used in the treatment of various dental conditions. Non-limiting examples of therapeutic dental appliances include orthodontic appliances, such as orthodontic aligners and orthodontic retainers, and splints, such as surgical splints and occlusal splints. Therapeutic dental appliances are used by patients for many reasons, including to improve and/or restore function, to aesthetically improve a patient's dentition, to reduce wear on teeth, and to treat joint pain and other medical conditions.

For example, orthodontic aligners are a type or kind of dental appliance used to reposition teeth during orthodontic treatment. It should be noted that the terms aligner, positioner, and tooth-positioning appliance are largely synonymous as used in the orthodontic field. This type of orthodontic treatment typically uses separate tooth-positioning appliances for the upper and lower teeth. The tooth-positioning appliances fit over the teeth, covering at least some of the facial and lingual surfaces of some or all of the teeth, and often at least some of the occlusal (or biting surfaces) of the teeth.

SUMMARY

According to embodiments of the present disclosure, an orthodontic appliance includes an olefin polymer formed via rapid prototyping without the use of an intermediary physical template. The olefin polymer may be formed from a polymer precursor solution including a monomer or oligomer, a catalyst, a quenching agent, and a UV absorbing agent. The quenching agent may be configured to modulate one or more reactions of the polymer precursor solution, and the orthodontic appliance results from the one or more reactions of the polymer precursor solution that are modulated in response to UV light.

In some embodiments, the olefin polymer may include or be a reaction product of olefin metathesis. In some embodiments, the olefin polymer may include or be a reaction product of ring opening metathesis polymerization (ROMP).

In some embodiments, the catalyst may be a Grubbs-type metathesis catalyst.

In some embodiments, the UV absorbing agent may be an optical brightener.

In some embodiments, the monomer or oligomer may include a cyclic alkene. In some embodiments, the monomer or oligomer may be or include a substituted or unsubstituted cyclooctene, a substituted or unsubstituted norbornene, a substituted or unsubstituted cyclobutene, a substituted or unsubstituted cyclopentene, a substituted or unsubstituted cyclopentadiene, or a substituted or unsubstituted cyclooctadiene. In some embodiments, the monomer or oligomer may include 1,5-cyclooctadiene, dicyclopentadiene, 5-ethylidene-2-norbornene, or a mixture thereof.

In some embodiments, the olefin polymer may include an alkane substituent. In some embodiments, the olefin polymer may include one or more substituents configured to participate in a cross-linking reaction.

In some embodiments, the polymer precursor solution may further include one or more cross-linking molecules including two or more functional groups capable of reacting with the one or more substituents of the olefin polymer.

In some embodiments, the polymer precursor solution may further include a plasticizer to increase the flexibility of the olefin polymer.

In some embodiments, the olefin polymer may have an elongation at break of about 6% to 200% and a stress resistance of at least about 5,000 psi.

In some embodiments, the orthodontic appliance may include a tab and slot arrangement. In some embodiments, the orthodontic appliance may include a tooth-clasping arrangement and a flexible arrangement that is less rigid than the tooth-clasping arrangement. In some embodiments, the orthodontic appliance may include a flexible curved interconnecting element between adjacent tooth-clasping arrangements.

In some embodiments, the olefin polymer may include two or more olefin polymers, and each of the two or more olefin polymers may have a different composition and/or mechanical properties from the others of the two or more olefin polymers. The two or more olefin polymers may be layered to form the orthodontic appliance.

According to embodiments of the present disclosure, a method of fabricating an orthodontic appliance includes providing a polymer precursor solution to a rapid prototyping machine. The polymer precursor solution may include a monomer or oligomer, a catalyst, and a UV absorbing agent, and one or more reactions of the polymer precursor solution may be modulated in response to UV light. The method further includes fabricating the orthodontic appliance from the polymer precursor solution using the rapid prototyping machine according to an appliance model.

In some embodiments, the polymer precursor solution may be configured to form a polymer via ring opening metathesis polymerization (ROMP).

In some embodiments, the monomer or oligomer may include 1,5-cyclooctadiene, dicyclopentadiene, 5-ethylidene-2-norbornene, or a mixture thereof.

BRIEF DESCRIPTION OF THE DRAWINGS

These and other features and advantages of the present invention will be better understood by reference to the following detailed description when considered in conjunction with the accompanying drawings.

DETAILED DESCRIPTION

Figure 1:
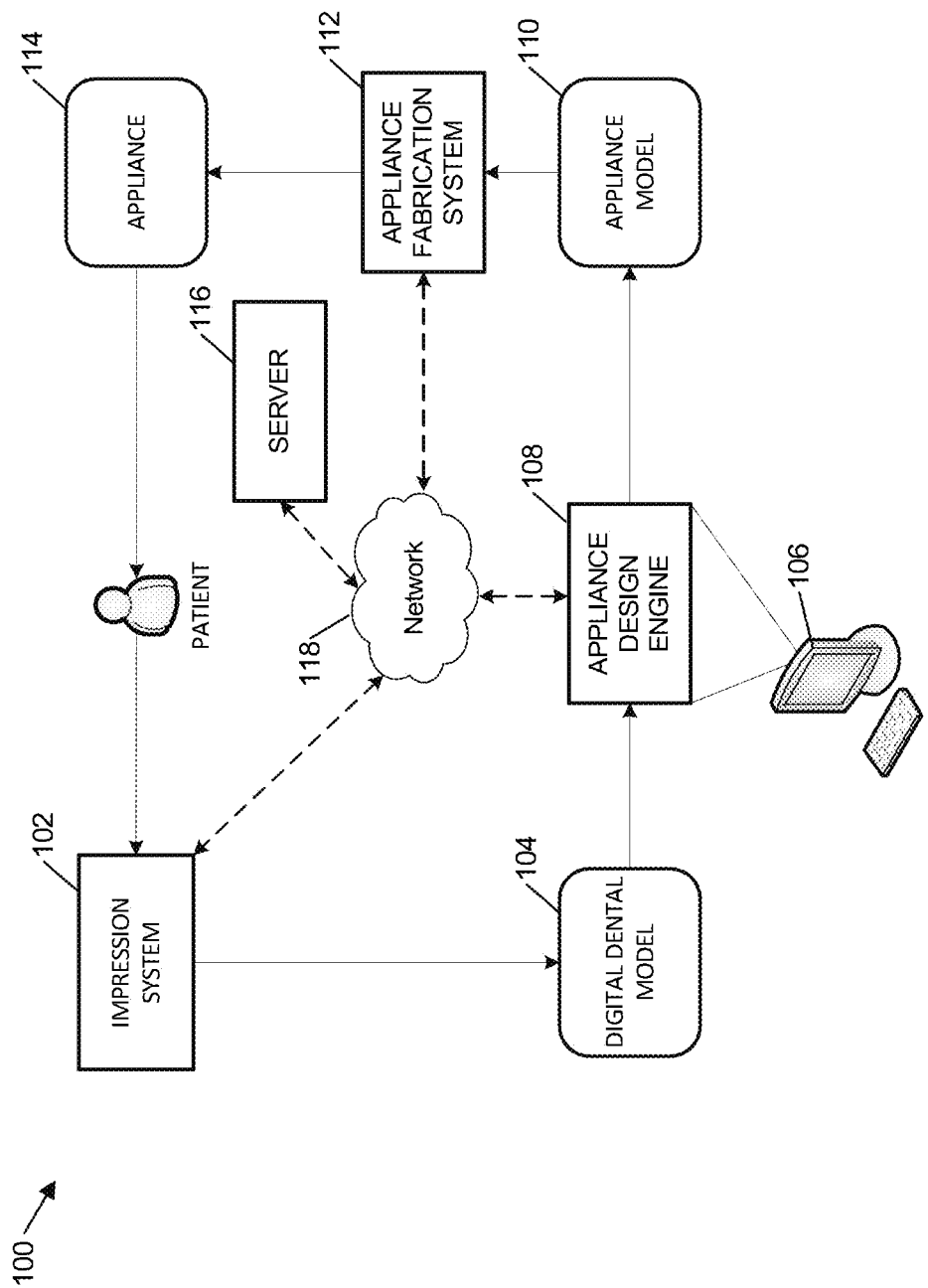
FIG. 1 is a schematic block diagram illustrating an example of a system for fabricating a dental appliance.

Various embodiments will be described in detail with reference to the drawings, wherein like reference numerals represent like parts and assemblies throughout the several views, and duplicative descriptions may not be provided. Reference to various embodiments does not limit the scope of the claims attached hereto. Additionally, any examples set forth in this specification are not intended to be limiting, and merely set forth some of the many possible embodiments for the appended claims.

The present disclosure relates to fabrication of dental appliances that are usable to provide therapy to a patient. Non-limiting examples of such dental appliances include dentures, crowns, partial crowns, fixed bridges, implants, temporary bridges and crowns, occlusal splints, sleep apnea appliances (e.g., appliances for preventing, reducing, or relieving sleep apnea), palatal expanders, and retainers (including, e.g., Essix and Hawley-type retainers). In particular, embodiments of the present disclosure relate to fabrication of orthodontic appliances, such as orthodontic aligners or positioners. For example, embodiments disclosed herein can be used to generate a series of removable orthodontic aligners to reposition a patient's teeth over time. Embodiments can also be used to fabricate the appliance fully or partially within an office of a medical professional. Beneficially, medical professionals can provide the appliance to the patient more quickly and can have more control over the design of the appliance using embodiments of this disclosure. While embodiments related to the fabrication of orthodontic appliances are described in extensive detail herein, those having ordinary skill in the art are capable of adapting the embodiments described herein to various related dental appliances (such as those described herein, and others that will be readily appreciated by those of ordinary skill in the art).

Orthodontic positioners are often traditionally made from a set of plaster models derived from three-dimensional negative dental impressions of a patient's teeth. The plaster dental models are then modified by cutting the plaster teeth apart using a small jeweler's saw or rotary cutting discs, followed by repositioning the plaster teeth in a better, straighter, desired arrangement, and then holding the teeth in the new arrangement with dental wax.

The repositioned dental models provide a basis for manufacturing the orthodontic positioners. The resilience of the material from which the positioners are made provides the energy and support to move the teeth from their original position toward the new straightened (modified) position. A series of orthodontic positioners are often made to move the teeth in incremental steps. However, making a series of appliances can be difficult and time-consuming when the tooth arrangement for each step must be made and adjusted by hand using plaster and wax.

Digital technologies can be used to overcome at least some of the difficulties associated with fabricating a series of aligners that move teeth incrementally. For example, Computer Aided-Design (CAD)/Computer-Aided Manufacturing (CAM) software can be used to produce dental models, from which a progressive series of appliances can be manufactured. The dental models can be generated from 3D images of the patient's dentition. These dental models can then be physically or virtually repositioned and used to form aligners. For example, the repositioned dental models can be used to fabricate dental models upon which aligners are formed using a combination of vacuum, pressure, and heat. This forming process is informally referred to within the orthodontic laboratory community as the "suck down" process.

In one process for producing a series of tooth aligners, a technician first scans a patient's upper and lower model set to obtain CAD-manipulatable virtual models of a patient's dental anatomy. A model set normally consists of one upper and one lower plaster model of the teeth, palate, and gums. Once the virtual model of the original malocclusion has been obtained, a technician will then therapeutically manipulate the virtual malocclusion. This may involve extensive repositioning of the teeth according to a comprehensive and sequential procedure, ultimately arriving at a finished or ideal occlusion for that patient. The finished occlusion in the virtual model corresponds to the complete repositioning of the patient's upper and lower occlusion that would result at the end of successful conventional orthodontic treatment. After the steps described above are accomplished, the technician possesses two versions of the patient's teeth available within the virtual CAD environment. One version represents the original malocclusion and the other represents the ideal occlusion. For example, the technician has virtual model sets corresponding to the beginning and the end states of treatment.

Another step in the process involves the creation of an incremental, progressive series of forming models. Each of these forming models represents a snapshot of the patient's future occlusion at specific incremental steps along the patient's proposed treatment sequence between the beginning and the end conditions as described above. To accomplish this, the technician creates a virtual first transition model. This virtual first transition model represents some or all of the teeth being subtly moved from their original pre-treatment positions to a virtual first transition position that is in the direction of their intended finished positions. Additional virtual transition models can be created similarly. In this manner, the technician creates a series of progressive models, with each biased slightly further than the previous one, and each moves the teeth slightly closer to their finished target positions. A final forming model will take the teeth from the series of transition positions and move them into their final, desired positions.

Once such a series of virtual intermediate forming models has been created and a final forming model has been created by the technician, digital code representing each of the models in the series is directed to operate a rapid prototyping machine. Using a rapid prototyping machine, the series of physical (e.g., non-virtual) forming models can be produced using any suitable process, such as computer numerically-controlled (CNC) machining, stereo lithography, or 3D printing. The production step results in the production of hard, physical duplicates of each of the series of virtual intermediate models and the final model. The terms "rapid prototyping machine" and "rapid fabrication machine" may be interchangeably used herein in their art recognized senses to refer to a machine or manufacturing device capable of quickly producing a scale model or part using, for example, the processes described herein.

Another step in the process sees each of the series of physical forming models being mounted in a thermoforming machine (also referred to as a suck-down machine) in turn, where a combination of heat, pressure and/or vacuum is used to form the actual series of progressive aligners (orthodontic positioners) from plastic sheet material of a constant thickness. Once the series of progressive aligners are formed and trimmed, they are sequentially labeled, packaged, and shipped to the attending orthodontist. The orthodontist then schedules an appointment for the patient, at which time the aligners and instructions for their use are given to the patient. The patient is instructed to wear the first set of aligners for a period of time, typically two weeks. After that, the first set is discarded and the patient transitions to the next set of the series, and so on.

The aligners can be configured to urge the patient's teeth to move according to the positional biases created in the virtual model sets by the technician. The teeth are progressively biased and urged to move in desired directions toward their predetermined finished positions by the resilience of the polymeric material of the aligner. Ideally, gentle but continuous forces would be delivered by the aligners, causing certain physiological processes involving the creation and/or remodeling of the bone supporting the roots of the teeth to take place. The net result should be the slow, progressive orthodontic movement of the roots of the teeth through the underlying bone toward desirable positions and orientations.

Many conventional removable aligners, for example, those produced by the "suck down" process described above, are limited by their design and the mechanical properties of the clear thermoplastic materials that are currently utilized. Clear polymeric materials make the aligner nearly invisible, which is a great advantage over fixed stainless steel hardware and metal braces. On the other hand, conventional polymeric materials used in forming aligners have a very limited ability to flex in all directions. This is particularly problematic when aligning teeth that are not fairly well lined up in the beginning of treatment. Recent published studies have shown that each stage of conventional aligners deliver fairly high forces when they are first delivered, and then the applied forces diminish rapidly. This results in intermittent force delivery rather than the desired light continuous, gentle forces.

Even when very small movements during each stage are attempted, the appliance may fail to properly engage teeth that need to be moved because the appliance is not adequately flexible and is not designed to allow movement within the plane of the material. If a particular aligner fails to properly engage a tooth, then that tooth will not move to the proper place to engage the next successive aligner in the series. The only present solutions available when aligners fail to properly engage a tooth are: (1) reduce the amount of movement attempted for that particular stage; or (2) place a different (e.g., larger) bonded attachment on the tooth; or (3) move back a step in the series of aligners and reattempt the movement. Both of these solutions typically require reworking the computerized treatment plan. If the plan is not revised, with each successive stage of the appliance, the fit of the aligners deteriorates, and after just a few stages, it becomes obvious that the teeth are not moving according to the original computerized treatment plan, forcing a revision of the treatment plan. The ability of the appliance to precisely engage individual teeth, whether they are to be moved or used as anchor teeth to assist in the movement of other teeth, is critical to the success of orthodontic treatment.

Conventional orthodontic aligners formed using the "suck down" process described above are typically limited to being formed of thermoplastic polymer materials that are stiff at room and oral temperatures (e.g., about 20° C. to about 37° C.) but are pliable at elevated temperatures and pressures (e.g., above about 100° C., for example 100° C. to 300° C., or 100° C. to 200° C.). This temperature-dependent change in flexibility, which may be formally characterized in terms of the glass transition temperature ($T_g$) of the material, is necessary to utilize conventional methods of forming such aligners, in which the polymer is shaped around a model of the patient's teeth.

The term "glass transition temperature ($T_g$)" is used herein in its art-recognized sense to refer to the temperature at which a polymeric material reversibly transitions from being a hard and crystalline material to a visco-elastic or rubber-elastic material, as mediated by the movement and realignment of amorphous regions within the polymer chain. The $T_g$ of a material can be measured using, for example, differential scanning calorimetry (DSC), dynamic mechanical analysis (DMA), or thermal mechanical analysis (TMA), among other techniques.

However, as discussed above, such materials and methods require the intermediary production of multiple forming molds or models, and may limit the shapes and features that can be formed into an orthodontic aligner.

Alternate methods of forming orthodontic devices and other dental appliances, for example, without the use of forming molds, have been limited by the materials available for those methods. For example, rapid prototyping and rapid fabrication methods have been contemplated for forming orthodontic aligners. However, the thermoplastic polymers used in the conventional "suck down" method is not compatible with rapid prototyping methods, and the polymers available for use with light-based rapid prototyping and rapid fabrication machines (e.g., acrylate resins, for example, urethane acrylates such as urethane dimethacrylate) tend to be highly cross-linked and strong (e.g., resistant to loads of up to about 7,000 psi), but have low impact resistance and low toughness. Attempts to modify the elongation at break characteristics of such acrylate resins by reducing the degree of polymer crosslinking have produced materials that are prone to deformation, and therefore cannot reliably maintain prolonged force on the teeth. Furthermore, such modified materials are prone to increased water absorption and saliva uptake, and are therefore inappropriate for oral use. As such, further development of orthodontic aligners based on such acrylate resins and their associated forming techniques has been limited.

The material properties of polymers depend not only on the degree of crosslinking within the polymer, but may be affected by a range of structural features, including copolymer structure, the overall backbone structure and geometry, the types or kinds of linkages between monomers, the types or kinds of sidechains on each monomer and their relative stereochemistry (tacticity), the degree of chain branching, and the molecular weight and polydispersity of the polymer. For example, alternate polymers based on a non-urethane, non-acrylate backbone may have improved elongation at break characteristics compared to, e.g., urethane dimethacrylate. However, the development and use of such polymers for dental appliances such as orthodontic appliances, and particularly in rapid prototype manufacturing and/or 3D printing of such appliances, has been limited by a lack of compatible polymers and methods of producing such polymers.

According to one or more embodiments of the present disclosure, an orthodontic appliance (e.g., orthodontic aligner) is fabricated from a dental-compatible olefin polymer. The olefin polymer is configured to have elongation at break characteristics suitable for the design and purpose of the orthodontic appliance. The olefin polymer is formed from a polymer precursor solution including a monomer or oligomer, a catalyst, and a UV absorbing agent, and the orthodontic appliance is formed via one or more reactions of the polymer precursor solution, which reactions are modulated in response (by exposure) to UV light. Moreover, the olefin polymer is directly deposited using a rapid prototyping machine and without the use of an intermediary physical template such as a forming model or mold.

As used herein, the term "dental-compatible" refers to materials that are suitable for use in dental and oral appliances and applications. For example, the material should be substantially insoluble, durable, and non-toxic to prevent or reduce ingestion of solutes, particles, and/or toxins by the user. The material should be substantially non-absorbent (e.g., should not absorb fluids, solids, and/or saliva) in order to avoid or reduce discoloration and unwanted tastes. In addition, the material should be resistant to growth of microbial cultures and biofilms, and/or easily sanitized. Finally, the material should have suitable mechanical properties (e.g., hardness, strength, elasticity, etc.) for the dental application and appliance use lifetime.

The terms "olefin polymer" and "polyolefin" are interchangeably used in their art-recognized sense to refer to a polymeric material that is formed from olefin-containing monomers and/or oligomers (e.g., monomers and/or oligomers including one or more alkene functional groups). The alkene functional groups included in the monomers and/or oligomers participate in intermolecular bond forming reactions to thereby form the polymer product. Further, the alkene functional groups undergo one or more addition reactions to form an alkane chain as the polymer backbone or a component of the polymer backbone. The term does not refer to or specify the inclusion of residual alkene functional groups once polymerization is terminated, and in some embodiments, the olefin polymer may be substantially free of alkene functional groups. However, embodiments of the present disclosure are not necessarily limited thereto, and in some embodiments, the olefin polymer contains a detectable concentration and/or a set amount of alkene functional groups, as determined by the monomers, oligomers, type or kind of polymerization reaction(s), polymerization time, quenching agents, and other relevant reaction conditions. Indeed, it will be understood that the compositions of the olefin polymers included in devices according to embodiments of the present disclosure may be modified in various ways or configured to contain suitable structures, side chains, and/or functional groups according to the principles described herein.

As used herein, the term "substantially" is used as a term of approximation, and not as a term of degree, and is intended to account for the difficulties in measuring, observing, or calculating exact values for certain parameters. For example, in this context, the term "substantially free of alkene functional groups" denotes that if the completed polymer contains any alkene functional groups, the alkenes are present only in trace amounts that do not measurably or observably contribute to the chemical or physical properties of the polymer, and/or have a negligible effect on the properties and performance characteristics of the polymer or any devices formed of the polymer.

In some embodiments, the olefin polymer may be selected or designed to have an elongation at break of about 6% to about 200%, and in some embodiments about 10% to about 180%, about 20% to about 160%, about 30% to about 150%, about 40% to about 140%, about 50% to about 130%, about 60% to about 120%, about 70% to about 110%, or about 80% to about 100%. In some embodiments, for example, the olefin polymer may be selected or designed to have an elongation at break of about 6% to about 20%, about 6% to about 15%, or about 7% to about 10%. Additionally, the olefin polymer may have a stress resistance of at least about 5,000 psi, and in some embodiments, about 5,000 psi to about 9,000 psi, for example, about 6,000 psi to about 8,000 psi.

The type of olefin polymer forming reaction is not particularly limited. In some embodiments, the olefin polymer may be formed by (e.g., may be a product of) vinyl polymerization. In some embodiments, the olefin polymer may be formed by (e.g., may be a product of) olefin metathesis, and in some embodiments, ring-opening metathesis polymerization (ROMP) or ROMP-type reactions. The term "vinyl polymerization" is used in its art-recognized sense to refer specifically to chain-forming reactions between vinyl (e.g., 1-ene) groups on successive monomers or oligomers. The term "olefin metathesis" is used in its art-recognized sense to refer to reactions in which the carbons of two reactant alkenes swap bonding partners, dissolving the initial reactant bonds and forming two new alkene bonds (e.g. $C_1=C_2+C_3=C_4 \rightarrow C_1=C_3+C_2=C_4$). The term "ROMP" refers specifically to an olefin metathesis reaction in which one of the two reactant alkenes is a cyclic alkene (i.e., a ring). In some embodiments, the cyclic alkene is destabilized relative to the corresponding linear alkene due to bonding strain (e.g., because the bonds in the cyclic alkene are constrained by the ring, and therefore cannot relax to the lowest energy conformation), such that the metathesis reaction is energetically driven by the release of ring strain when the cyclic alkene bond is broken. In olefin metathesis polymerization and ROMP, the reaction occurs between a first alkene in the substrate (e.g., monomer) and a second M=L "alkene" in the catalyst (e.g., at the double bond between the metal and a carbene ligand, where the ligand L may be part of a polymer chain). When the polymer is formed by ROMP, a wide range of monomers and oligomers may be compatible with the reaction, thereby enabling the production of polymers having specific and/or desired properties for a particular application, such as production of orthodontic appliances according to embodiments of the present disclosure.

A catalyst is often required or desired to initiate, promote, or proliferate one or more reactions required for polymerization. The type or kind of catalyst is not particularly limited as long as it is able to suitably react with the monomers and oligomers used to form the polymer. For example, the catalyst should be suitably stable under the operative reaction conditions, and should allow the polymerization to progress to a suitable degree at a reasonable timescale, for example, to be complete within about 20 minutes, or in some embodiments less than about 10 minutes including further processing steps. In some embodiments, a reasonable timescale may be about 0.5 second to about 8 minutes, about 1 second to about 5 minutes, about 5 seconds to about 3 minutes, about 5 seconds to about 2 minutes, about 10 seconds to about 1 min, about 0.5 seconds to about 2 seconds, about 0.5 seconds to about 1.5 seconds, about 0.5 seconds to about 1 second, etc. Here, "complete" may refer to formation of a solid or semi-solid material having a shape and form that is durable and stiff enough to allow patient use without the risk of deformation, or to allow further processing before patient use. The further processing may include any suitable treatment for modifying the characteristics of the polymer and/or driving the polymerization reaction to completion, and in some embodiments, may include heating the material in a microwave or oven.

The catalyst may be a homogeneous catalyst or a heterogeneous catalyst. In some embodiments, the catalyst may be a homogeneous catalyst. For example, the catalyst may be mixed with the monomers, oligomers, and other reagents used to form the polymer, and in some embodiments may be dissolved with such reagents in a common solvent. The catalyst may be provided in any suitable form, for example, may be provided as one or more metal salts, one or more organic or inorganic ligands, one or more enzymes, one or more organometallic complexes, one or more cofactors, a mixture thereof, etc. Further, the catalyst may be provided as a pre-catalyst or catalyst precursor that is transformed to the active catalyst in solution or during working conditions, and it is understood that references herein to the catalyst may encompass the catalyst as added (e.g., the pre-catalyst or catalyst precursor), and/or the active catalyst. When the catalyst includes a metal salt, the metal may include a transition metal. Non-limiting examples of such transition metals included in the catalyst may include titanium (Ti), vanadium (V), chromium (Cr), manganese (Mn), iron (Fe), cobalt (Co), nickel (Ni), copper (Cu). zinc (Zn), zirconium (Zr), niobium (Nb), molybdenum (Mo), technetium (Tc), ruthenium (Ru), rhodium (Rh), palladium (Pd), hafnium (Hf), tantalum (Ta), tungsten (W), rhenium (Rh), osmium (Os), iridium (Ir), platinum (Pt), and gold (Au). Each of the one or more organic or inorganic ligands included independently or as part of the organometallic complex is not particularly limited, and may be L-, X-, or combination type ligands. As used herein in their art-recognized sense, "X-type ligand" refers to an anionic ligand formally donating a single electron, "L-type ligand" refers to a neutral ligand formally donating a pair of electrons, and "combination ligand" refers to a ligand donating a combination of the above via a combination of orbital interactions, such as an XL ligand donating a total of three electrons. The denticity of each ligand is not particularly limited, and may be monodentate, bidentate, tridentate, etc. Non-limiting examples of classes of ligands that may be included in the catalyst include halogen atoms, hydrides, N-heterocyclic carbenes (NHCs), Fischer-type carbenes, Schrock-type carbenes, hydroxides, alkoxides, sulfides, amines, amides, nitrides, nitridos, phosphines, phosphates, carbonyls, isocyanides, carboxylates, σ- or π-aromatic groups, etc. As used herein, the terms "NHC", "Fischer-type carbene", and "Schrock-type carbene" are used in their art-recognized sense to refer to a ligand having a central $sp^2$ carbon having a valence of 2 and being capable of forming a metal-ligand bond with the metal. In NHC carbenes, the carbon is bonded to two nitrogen atoms within a cyclic imidazole ring, and p-orbital overlap between the carbon and nitrogen atoms causes the carbon to act as a strong sigma donor ligand. In Fischer-type carbenes, the carbon may have pi-donor substituents, may be preferentially bonded to low-valent metals having pi-acceptor ligands, and may be partially electrophilic. In Schrock-type carbenes, the carbon may have alkyl and hydrogen substituents, may be preferentially bonded to high-valent metals having pi-donor ligands, and may act as a nucleophile.

Furthermore, the catalyst may be selected according to the intended type or kind of polymerization reaction. In some embodiments, for example, when the polymer is produced by vinyl polymerization, the catalyst may be a Ziegler-Natta type catalyst. In some embodiments, when the polymer is produced by olefin metathesis, the catalyst may be a Schrock-type or a Grubbs-type catalyst, as those terms and catalysts are known and understood in the relevant art. In some embodiments, the polymer may be produced by olefin metathesis and the catalyst may be a Ru-based Grubbs-type metathesis catalyst. As used herein, the term "Grubbs-type metathesis catalyst" is used in its art-recognized sense to refer to a Group 8 (e.g., ruthenium)-based homogeneous catalyst bearing a Fischer carbene (e.g., an M=C bond) that is active for olefin metathesis. In some embodiments, the M=C bond may be directly involved (e.g., may be the active site of polymerization and/or may act as a reagent) in the olefin metathesis reaction, and the moieties attached to the carbon of the M=C bond may change as the metathesis reaction progresses.

In some embodiments, the olefin polymerization reactions and/or the catalyst are "UV-activated", or active only in the presence of ultraviolet (UV) light. For example, the olefin polymerization reactions and/or the catalyst may be active when a particular energy input is present, and inactive in the absence of that energy input, such that the progress of the polymerization reactions can be tightly controlled over space and time by using the appropriate or suitable reaction conditions. In some embodiments, "UV-activated" means that the olefin polymerization reactions occur at a faster rate under UV irradiation, compared to the base rate in the absence of UV. For example, the olefin polymerization reaction rates may be at least about 2 times, about 10 times, about 100 times, or 1000 times faster under UV irradiation. When the olefin polymerization reactions are UV-activated, the progress of the polymerization reaction can be controlled (e.g., stopped, started, or accelerated) on rapid timescales (e.g., within a fraction of a second or on the order of micro, nano, or picoseconds), and can be spatially controlled (e.g., can be configured to selectively occur or be selectively accelerated in particular regions of the reagent mixture and therefore form the polymer product in a particular shape). As such, compositions that undergo such UV-controlled olefin polymerization reactions, referred to as polymer precursor solutions, may be used with rapid prototyping manufacturing techniques, such as 3D printing and stereolithography.

In some embodiments, the polymer precursor solution may be configured to be UV-activated by the addition of an inhibitor. The term "inhibitor" may be interchangeably used herein with the term "quenching agent" to reflect the fact that the quenching agent quenches (or stops) the polymerization reaction under certain conditions. The inhibitor may inactivate or reduce the rate of catalysis under dark conditions, and may itself by inactivated under UV irradiation. In some embodiments, the inhibition or quenching may be reversible. In some embodiments, for example, the inhibitor or quenching agent may react and be incorporated into the polymer only under UV irradiation. As used herein, the term "dark conditions" may refer to the absence of catalysis-activating light (such as UV irradiation), whether incidental or actively targeted at the polymer precursor solution.

In some embodiments, the inhibitor may act as a ligand to the catalyst, as described below, and the inhibitor may associate and dissociate from the catalyst in response to UV irradiation. In some embodiments, the inhibitor may associate with the polymer chain. In some embodiments, the inhibitor may form a complex with the catalyst that is inactive under dark conditions, but switchable to being active under UV irradiation or other energetic triggers. However, embodiments of the present disclosure are not limited thereto, and other mechanisms or types of inhibition may be possible.

In some embodiments, the polymer precursor solution may be configured to be UV-activated by the addition of a promoter (or co-factor). The promoter may be inactive under dark conditions, and may activate or increase the rate of catalysis under UV irradiation. In some embodiments, the promoter may act as a ligand to the catalyst, as described below, and the promoter may associate and dissociate from the catalyst in response to UV irradiation. In some embodiments, the promoter may associate with the polymer chain, as described below. However, embodiments of the present disclosure are not limited thereto.

In some embodiments, the polymer precursor solution may be configured to be UV-activated via control of the catalyst. In some embodiments, the catalyst may be configured to be UV-activated via the presence of a ligand or molecule that acts as an inhibitor or promoter by modifying the active site, electronic state, and/or coordination sphere of the catalyst. For example, the ligand or molecule may be capable of assuming a binary state based on the presence or absence of UV irradiation. As such, UV irradiation may trigger a change in the state of the ligand or molecule, which in turn, may change the activity of the catalyst.

In some embodiments, the catalyst may be configured to be UV-activated via a ligand or molecule that remains bound to the metal center in the absence of UV light, but undergoes ligand dissociation under UV irradiation (e.g., the ligand or molecule is photolabile), such that reagents can then interact with the catalyst at the now-empty coordination site. In some embodiments, the ligand or molecule may remain bound to or within the coordination sphere of the catalyst, but the ligand may undergo a UV-mediated intramolecular reaction that changes its geometry and bonding interaction with the metal center, thereby changing the electronic structure of the catalyst and hence its chemical reactivity.

In some embodiments, the catalyst may be configured to be UV-activated via a ligand or molecule that does not interact with the metal center in the absence of UV light, but undergoes ligand association under UV irradiation conditions to form an intermediate complex or structure that is more active for the polymerization reaction than the complex or structure that is predominant under dark conditions.

In some embodiments, the inhibitor or promoter may interact with the polymer chain in addition to or instead of interacting with the catalyst. For example, the inhibitor may form a complex or intermediate with the polymer chain under dark conditions (such as at the olefin functional group) that prevents the polymer chain from undergoing further reaction. As another example, the promoter may form a complex or intermediate with the polymer chain under UV irradiation conditions that polymerizes at a faster rate than the isolated polymer chain under dark conditions. In some embodiments, when the polymer is formed according to a ROMP-type reaction and the polymer precursor solution is UV-activated, the polymer may be formed by UV-activated ROMP, such as photolithographic ring-opening polymerization (PLOMP).

Embodiments of the present disclosure are not limited to the above, and it will be understood that embodiments of the present disclosure are not limited or bound by the particular mechanism of catalysis and/or UV activation.

The wavelength of UV light used to activate the catalyst is not particularly limited, but may depend on the electronic structure (e.g., absorption spectrum) of the catalyst, which in turn may depend on the transition metal atom, its valence or oxidation state, and its ligand coordination sphere (including the type or kind of ligands bonded to the metal, the type or kind of each bonding interaction, and the geometry of said ligands around the transition metal atom). In some embodiments, the UV light may have a wavelength of about 200 nm to about 460 nm, for example, about 250 nm to about 410 nm. In some embodiments, the light may have a wavelength of about 385 nm and/or about 405 nm. The light may be provided as a mixture of one or more specific wavelengths corresponding to the absorption peaks of the catalyst, or as a broad spectral range of wavelengths. The light may be generated by any suitable exposure source, such as a digital projector, a lamp, an LED, a laser, etc. The light may be in any suitable form, and for example, may be collimated (coherent) or non-coherent, and/or may be pulsed. However, embodiments of the present disclosure are not limited thereto, and a person of skill in the art is capable of selecting a suitable light, exposure source, and wavelengths according to the principles described herein.

In some embodiments, the catalyst may be a Fischer-type carbene ruthenium catalyst, such as a Grubbs-type olefin metathesis catalyst (Grubbs catalyst), In some embodiments, when the catalyst is a Grubbs catalyst that is also configured to be UV-activated, the catalyst and/or ligands may have a structure and/or mechanism substantially similar to those disclosed in U.S. Pat. No. 9,207,532, titled "Photoinitiated olefin metathesis polymerization", the entire content of which is incorporated herein by reference. However, embodiments of the present disclosure are not limited thereto, and those having ordinary skill in the art are capable of selecting alternative catalysts and ligands according to the principles described herein.

In some embodiments, for example, the Grubbs catalyst and/or the polymer precursor solution may be configured to be UV-activated using an inhibitor (or quenching agent). The inhibitor may inhibit one or more reactions required for polymerization, and may be active according to any suitable mechanism, including those described herein. For example, the inhibitor may be key to making the polymer precursor solution photoactive, such that its polymerization may be controlled by the application or absence of UV light.

In some embodiments, the UV-active Grubbs-type catalyst may have a structure represented by Formula 1:

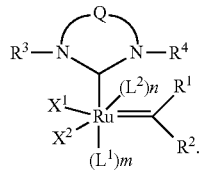

Formula 1

In some embodiments, the UV-active Grubbs-type catalyst may have a structure represented by Formula 2:

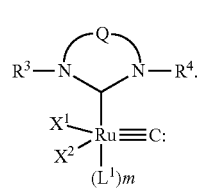

Formula 2

In Formulae 1 and 2, $L^1$ and $L^2$ may each be neutral 2-electron donor ligands. For example, $L^1$ and $L^2$ may each be or include a functional group including a lone pair of electrons in a 2p or 3p orbital, for example, on an oxygen, nitrogen, phosphorus, sulfur, or carbon atom. Non-limiting examples of neutral 2-electron donor ligands include amine, phosphine, ether (including cyclic ethers), carbene, sulfonated phosphine, phosphite, phosphinite, phosphonite, arsine, stibine, amide, imine, sulfoxide, carboxyl, nitrosyl, pyridine, pyridine, imidazole imidazole, pyrazine, pyrazine or thioether.

Non-limiting examples of nitrogen atom-containing heterocycles suitable for $L^1$ and $L^2$ include pyridine, bipyridine, pyridazine, pyrimidine, bipyrimidine, pyrazine, 1,3,5-triazine, 1,2,4-triazine, 1,2,3-triazine, pyrrole, 2H-pyrrole, 3H-pyrrole, pyrazole, 2H-imidazole, 1,2,3-triazole, 1,2,4-triazole, indole, 3H-indole, 1H-isoindole, cyclopenta(b)pyridine, indazole, quinoline, bisquinoline, isoquinoline, bisisoquinoline, cinnoline, guinazoline, naphthyridine, piperidine, piperazine, pyrrolidine, pyrazolidine, quinuclidine, imidazolidine, picolylimine, purine, benzimidazole, bisimidazole, phenazine, acridine, and carbazole. Each of these nitrogen atom-containing heterocycles may be optionally substituted or unsubstituted.

Non-limiting examples of sulfur-containing heterocycles suitable for $L^1$ and $L^2$ include thiophene, 1,2-dithiole, 1,3-dithiole, thiepin, benzo(b)thiophene, benzo(c)thiophene, thionaphthene, dibenzothiophene, 2H-thiopyran, 4H-thiopyran, and thioanthrene. Each of these sulfur atom-containing heterocycles may be optionally substituted or unsubstituted.

Non-limiting examples of oxygen-containing heterocycles suitable for $L^1$ and $L^2$ include 2H-pyran, 4H-pyran, 2-pyrone, 4-pyrone, 1,2-dioxin 1,3-dioxin, oxepin, furan, 2H-1-benzopyran, coumarin, coumarone, chromene, chroman-4-one, isochromen-1-one, isochromen-3-one, xanthene, tetrahydrofuran, 1,4-dioxane, and dibenzofuran. Each of these oxygen atom-containing heterocycles may be optionally substituted or unsubstituted.

Non-limiting examples of mixed heterocycles suitable for $L^1$ and $L^2$ include isoxazole, oxazole, thiazole, isothiazole, 1,2,3-oxadiazole, 1,2,4-oxadiazole, 1,3,4-oxadiazole, 1,2,3, 4-oxatriazole, 1,2,3,5-oxatriazole, 3H-1,2,3-dioxazole, 3H-1,2-oxathiole, 1,3-oxathiole, 4H-1,2-oxazine, 2H-1,3-oxazine, 1,4-oxazine, 1,2,5-oxathiazine, o-isooxazine, phenoxazine, phenothiazine, pyrano[3,4-b]pyrrole, indoxazine, benzoxazole, anthranil, and morpholine.

Non-limiting examples of the amine include trimethylaminetriethylamine, and triphenylamine. Non-limiting examples of the phosphine include trimethylphosphine, ($PMe_3$), triethylphosphine ($PEt_3$), tri-n-butylphosphine ($PBu_3$), tri(ortho-tolyl)phosphine (P-o-tolyl$_3$), tri-tert-butylphosphine (P-tert-Bu$_3$), tricyclopentylphosphine (PCyclopentyl$_3$), tricyclohexylphosphine ($PCy_3$), triisopropylphosphine (P-i-Pr$_3$), trioctylphosphine ($POct_3$), triisobutylphosphine, (P-i-Bu$_3$), triphenylphosphine ($PPh_3$), tri(pentafluorophenyl)phosphine ($P(C_6F_5)_3$), methyldiphenylphosphine ($PMePh_2$), dimethylphenylphosphine ($PMe_2Ph$), or diethylphenylphosphine ($PEt_2Ph$). Non-limiting examples of the ether include diethylether, dibutylether, and tetrahydrofuran.

In some embodiments, $L^1$ and $L^2$ may each independently be pyridine, triphenylphosphine, triethylphosphine, or tricyclohexylphosphine.

$X^1$ and $X^2$ may each be anionic ligands. Non-limiting examples of anionic ligands include halide (such as chloride, bromide, and iodide), benzoate, an acyl group, an alkoxycarbonyl group, an alkyl group, phenoxy, an alkoxy group, alkylsulfanyl, aryl, and alkylsulfonyl. For example, $X^1$ and $X^2$ may each be chloride, bromide, iodide, $CF_3CO_2^-$, $CH_3CO_2^-$, $CFH_2CO_2^-$, $(CH_3)_3CO^-$, $(CF_3)_2(CH_3)CO^-$, $(CF_3)(CH_3)_2CO^-$, $PhO^-$, $MeO^-$, $EtO^-$, tosylate, mesylate, or trifluoromethane-sulfonate. In some embodiments, $X^1$ and $X^2$ may each be chloride.

m and n may each independently be 0 or 1. In some embodiments, the catalyst may be added or initially included in a state where m and n are both 1, but may be in converted to or in equilibrium with an analogous complex in which m and/or n is 0 (for example m and n being 1 and 0, respectively, or 0 and 1, respectively).

Q may be a two-atom linkage having the structure $-CR^{21}R^{22}-CR^{23}R^{24}-$ or $-CR^{21}=CR^{23}-$, where $R^{21}$, $R^{22}$, $R^{23}$, and $R^{24}$ may each independently be hydrogen, deuterium, a substituted or unsubstituted $C_1$-$C_{60}$ alkyl group, a substituted or unsubstituted $C_2$-$C_{60}$ alkenyl group, a substituted or unsubstituted $C_2$-$C_{60}$ alkynyl group, a substituted or unsubstituted $C_3$-$C_{10}$ cycloalkyl group, a substituted or unsubstituted $C_2$-$C_{10}$ heterocycloalkyl group, a substituted or unsubstituted $C_3$-$C_{10}$ cycloalkenyl group, a substituted or unsubstituted $C_1$-$C_{10}$ heterocycloalkenyl group, a substituted or unsubstituted $C_6$-$C_{60}$ aryl group, a substituted or unsubstituted $C_1$-$C_{60}$ heteroaryl group, a substituted or unsubstituted non-aromatic condensed polycyclic group, or a substituted or unsubstituted non-aromatic condensed heteropolycyclic group. In some embodiments, $R^{21}$ to $R^{24}$ may each be hydrogen.

In Formula 1, $R^1$ and $R^2$ may each independently be hydrogen, deuterium, a substituted or unsubstituted $C_1$-$C_{60}$ alkyl group, a substituted or unsubstituted $C_2$-$C_{60}$ alkenyl group, a substituted or unsubstituted $C_2$-$C_{60}$ alkynyl group, a substituted or unsubstituted $C_3$-$C_{10}$ cycloalkyl group, a substituted or unsubstituted $C_2$-$C_{10}$ heterocycloalkyl group, a substituted or unsubstituted $C_3$-$C_{10}$ cycloalkenyl group, a substituted or unsubstituted $C_1$-$C_{10}$ heterocycloalkenyl group, a substituted or unsubstituted $C_6$-$C_{60}$ aryl group, a substituted or unsubstituted $C_1$-$C_{60}$ heteroaryl group, a substituted or unsubstituted non-aromatic condensed polycyclic group, or a substituted or unsubstituted non-aromatic condensed heteropolycyclic group. In some embodiments, $R^2$ may be an ethyl group or a butyl group.

In Formulae 1 and 2, $R^3$ and $R^4$ may each independently be hydrogen, deuterium, a substituted or unsubstituted $C_1$-$C_{60}$ alkyl group, a substituted or unsubstituted $C_2$-$C_{60}$ alkenyl group, a substituted or unsubstituted $C_2$-$C_{60}$ alkynyl group, a substituted or unsubstituted $C_3$-$C_{10}$ cycloalkyl group, a substituted or unsubstituted $C_2$-$C_{10}$ heterocycloalkyl group, a substituted or unsubstituted $C_3$-$C_{10}$ cycloalkenyl group, a substituted or unsubstituted $C_1$-$C_{10}$ heterocycloalkenyl group, a substituted or unsubstituted $C_6$-$C_{60}$ aryl group, a substituted or unsubstituted $C_1$-$C_{60}$ heteroaryl group, a substituted or unsubstituted non-aromatic condensed polycyclic group, or a substituted or unsubstituted non-aromatic condensed heteropolycyclic group. In some embodiments, $R^3$ and $R^4$ may each independently be phenyl, mesityl (2,4,6-trimethylphenyl), adamantyl, 2-isopropylphenyl, 2,6-diisopropylphenyl, or a similar sterically hindering group Any two or more of $X^1$, $X^2$, $L^1$, $L^2$, $R^1$, and $R^2$ can optionally be linked together to form one or more cyclic groups.

In some embodiments, $X^1$ and $X^2$ may each be Cl; $L^1$ and $L^2$ may each be pyridine; m is 1; n may be 1; $R^1$ may be H; $R^2$ may be Ph; $R^3$ and $R^4$ may each be mesityl; and Q may be $CH_2CH_2$. In some embodiments, $X^1$ and $X^2$ may each be Cl; $L^1$ and $L^2$ may each be pyridine; m may be 1; n may be 1; $R^1$ may be H; $R^2$ may be OEt; $R^3$ and $R^4$ may each be mesityl; and Q may be $CH_2CH_2$.

In some embodiments, $X^1$ and $X^2$ may each be Cl; $L^1$ may be tricyclohexylphosphine; m may be 1; n may be 0; $R^1$ may be H; $R^2$ may be Ph; $R^3$ and $R^4$ may each be mesityl; and Q may be $CH_2CH_2$. In some embodiments, $X^1$ and $X^2$ may each be Cl; $L^1$ may be tricyclohexylphosphine; m may be 1; n may be 0; $R^1$ may be H; $R^2$ may be OEt; $R^3$ and $R^4$ may each be mesityl; and Q may be $CH_2CH_2$.

The term "$C_1$-$C_{60}$ alkyl group" as used herein refers to a linear or branched aliphatic saturated hydrocarbon monovalent group including 1 to 60 carbon atoms. Non-limiting examples thereof include a methyl group, an ethyl group, a propyl group, an isobutyl group, a sec-butyl group, a tert-butyl group, a pentyl group, an isoamyl group, and a hexyl group.

The term "$C_2$-$C_{60}$ alkenyl group" as used herein refers to a linear or branched hydrocarbon group including at least one double bond. Non-limiting examples thereof include an ethenyl group, a propenyl group, and a butenyl group.

The term "$C_2$-$C_{60}$ alkynyl group" as used herein refers to a linear or branched hydrocarbon group including at least one triple bond. Non-limiting examples thereof include an ethynyl group and a propynyl group.

The term "$C_3$-$C_{10}$ cycloalkyl group" as used herein refers to a cyclic saturated hydrocarbon group including 3 to 10 carbon atoms connected in a ring. Non-limiting examples thereof include a cyclopropyl group, a cyclobutyl group, a cyclopentyl group, a cyclohexyl group, and a cycloheptyl group.

The term "$C_2$-$C_{10}$ heterocycloalkyl group" as used herein refers to a cyclic group including 2 to 10 carbon atoms and at least one heteroatom selected from N, O, Si, P, and S, connected in a ring. Non-limiting examples thereof include a 1,2,3,4-oxatriazolidinyl group, a tetrahydrofuranyl group, and a tetrahydrothiophenyl group.

The term "$C_3$-$C_{10}$ cycloalkenyl group" as used herein refers to a non-aromatic cyclic group including 3 to 10 carbon atoms and at least one double bond, connected in a ring. Non-limiting examples thereof include a cyclopentenyl group, a cyclohexenyl group, and a cycloheptenyl group.

The term "$C_1$-$C_{10}$ heterocycloalkenyl group" as used herein refers to a cyclic group including 1 to 10 carbon atoms, at least one heteroatom selected from N, O, Si, P, and S, and at least one double bond, connected in a ring. Non-limiting examples of the $C_1$-$C_{10}$ heterocycloalkenyl group include a 4,5-dihydro-1,2,3,4-oxatriazolyl group, a 2,3-dihydrofuranyl group, and a 2,3-dihydrothiophenyl group.

The term "$C_6$-$C_{60}$ aryl group" as used herein refers to an aromatic group including 6 to 60 carbon atoms. Non-limiting examples of the $C_6$-$C_{60}$ aryl group include a phenyl group, a naphthyl group, an anthracenyl group, a phenanthrenyl group, a pyrenyl group, and a chrysenyl group. When the $C_6$-$C_{60}$ aryl group includes two or more rings, the rings may be fused (e.g., condensed) to each other.

The term "$C_1$-$C_{60}$ heteroaryl group" as used herein refers to an aromatic group including 1 to 60 carbon atoms and at least one heteroatom selected from N, O, Si, P, and S in one or more rings. Non-limiting examples of the $C_1$-$C_{60}$ heteroaryl group include a pyridinyl group, a pyrimidinyl group, a pyrazinyl group, a pyridazinyl group, a triazinyl group, a quinolinyl group, and an isoquinolinyl group. When the $C_1$-$C_{60}$ heteroaryl group includes two or more rings, the rings may be condensed with each other.

The term "non-aromatic condensed polycyclic group" as used herein refers to a non-aromatic group including two or more rings condensed with each other, and only carbon atoms as ring-forming atoms. The term "non-aromatic condensed heteropolycyclic group" as used herein refers to a non-aromatic group including two or more rings condensed to each other, and at least one heteroatom selected from N, O, Si, P, and S, in addition to carbon atoms, as ring-forming atoms.

The term "substituted" as used herein refers to replacement of a hydrogen atom in the named group with a non-hydrogen group or moiety. The non-hydrogen group or moiety may be referred to as a "substituent". For example, the degree of substitution of one or more atoms in the listed group may be increased from primary to secondary, tertiary, or quaternary; secondary to tertiary or quaternary; or tertiary to quaternary. The named group retains the same functional group classification; for example, a phenyl group may be substituted by replacing a hydrogen atom with an amine group to form a phenyl amine, but the term "substituted" is not intended to encompass replacing a carbon atom with a nitrogen atom to form a pyridine.

When substituted, the above groups may include one or more substituents selected from any of the groups above, as well as deuterium, —F, —Cl, —Br, —I, a hydroxyl group, a cyano group, a nitro group, an amidino group, a hydrazino group, a hydrazono group, an ether group; a silyl group, an amino group, a boryl group, a carbonyl group, a sulfonyl group, and a phosphate group, but embodiments of the present disclosure are not limited thereto.

In some embodiments, and in particular when the catalyst is a UV-active Grubbs-type catalyst, the inhibitor may be an olefin-containing molecule (hereafter referred to as "olefin-containing quencher") that is capable of reversibly interacting with or binding (coordinating) to the Grubbs-type catalyst under dark conditions and rendering the catalyst temporarily inactive, and dissociating or being displaced from the catalyst under UV irradiation conditions, allowing the catalyst to become active. In some embodiments, the olefin-containing quencher may act as a ligand to the Grubbs-type catalyst. In some embodiments, the olefin-containing quencher may compete with one or more monomers, oligomers, or polymer chains for interaction with the catalyst.

In some embodiments, the olefin-containing quencher may include a functional group capable of interacting with or binding to the catalyst, such as a vinyl group. In some embodiments, for example, the olefin-containing quencher may include a vinyl group conjugated with a heteroatom.

In some embodiments, for example, the olefin-containing quencher may have a structure represented by Formula 3:

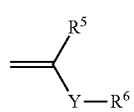

Formula 3

In Formula 3, Y may be O, N($R^7$), or S; and $R^5$, $R^6$, and $R^7$ may each independently be selected from hydrogen, deuterium, a substituted or unsubstituted $C_1$-$C_{60}$ alkyl group, a substituted or unsubstituted $C_2$-$C_{60}$ alkenyl group, a substituted or unsubstituted $C_2$-$C_{60}$ alkynyl group, a substituted or unsubstituted $C_3$-$C_{10}$ cycloalkyl group, a substituted or unsubstituted $C_2$-$C_{10}$ heterocycloalkyl group, a substituted or unsubstituted $C_3$-$C_{10}$ cycloalkenyl group, a substituted or unsubstituted $C_1$-$C_{10}$ heterocycloalkenyl group, a substituted or unsubstituted $C_6$-$C_{60}$ aryl group, a substituted or unsubstituted $C_1$-$C_{60}$ heteroaryl group, a substituted or unsubstituted non-aromatic condensed polycyclic group, and a substituted or unsubstituted non-aromatic condensed heteropolycyclic group.

In some embodiments, Y may be O or N(H). In some embodiments, the olefin-containing molecule may be a vinyl ether-type compound or derivative thereof. In some embodiments, the olefin-containing molecule may be ethyl vinyl ether (Y=O, $R^1$=CH, and $R^2$=ethyl).

Without being bound by the correctness or accuracy of any particular theory or explanation, it is thought that the olefin-containing quenching agent (e.g., ethyl vinyl ether) may coordinate with the catalyst to form a complex that is stable and unreactive for olefin metathesis polymerization under dark conditions. For example, the complex may be a formally 14 electron complex including the olefin-containing quencher in its coordination sphere (e.g., a ruthenium vinyl ether complex). In some embodiments, the complex may be further stabilized by interaction (e.g., dative bonding) with the olefin-rich polymer precursor solution (e.g., with the viscous polymer precursor solution that has been partially polymerized), for example, as a transient 16 electron complex, but embodiments of the present disclosure are not limited thereto. The ruthenium vinyl complex may be stable and unreactive with a polymer chain and/or a monomer or oligomer in the polymer precursor solution, effectively preventing the polymer chain from being extended via olefin metathesis. However, the ruthenium vinyl complex may be activated upon UV irradiation, allowing the polymer chain, monomer, and/or oligomer to interact with the catalyst and participate in one or more polymerization reactions when the polymer precursor solution is exposed to said irradiation. Thus, the complex may be considered the "active ingredient" that possesses a latent ability, triggered by UV irradiation, to catalyze formation of the desired polymer. For example, the complex may be considered to be UV-switchable between stable and activated states.

Without being bound by the correctness or accuracy of any particular theory or explanation, in some embodiments, the excited complex may itself be active for polymerization, and in some embodiments, the ruthenium vinyl ether complex may be converted to a second and/or intermediate complex that is active for polymerization. For example, it is possible that the quenching agent (e.g., bound vinyl ether) may react under UV irradiation and be incorporated into the polymer. As another example, it is possible that the quenching agent may preferentially dissociate from the ruthenium complex under UV irradiation, thereby generating a complex that can actively catalyze polymerization. However, embodiments of the present disclosure are not limited thereto, and it is understood that those having ordinary skill in the art are capable of selecting alternative catalysts, ligands, and inhibitors (quenching agents) according to the principles described herein.

The olefin polymer may be formed from one or more monomers and/or oligomers. For example, the olefin polymer may be formed of a single kind of monomer or oligomer, a mixture of two monomers or oligomers, or a mixture of three or more monomers or oligomers. The number of distinct monomers and/or oligomers used to form the olefin polymer is not particularly limited, and may be selected according to the desired properties of the olefin polymer.

The types and kinds of monomers and/or oligomers used to form the olefin polymer are not particularly limited as long as they each include at least one alkene functional group, or in some embodiments, a compatible functional group capable of reacting with the alkene functional group(s) of the other monomers and/or oligomers. In some embodiments, one or more of the monomers and/or oligomers may include at least two such alkenes or functional groups in order to form a continuous chain. At least one type or kind of monomer and/or oligomer should include an alkene functional group.

The monomers and/or oligomers including the alkene functional group may be linear alkenes, linear branched alkenes, or cyclic alkenes. The term "cyclic alkene" is used in its art-recognized sense to refer to an alkene positioned within a ring structure. For example, the ring structure may be a cyclobutane (4 membered) ring, a cyclopentane (5-membered) ring, a cyclohexane (6-membered) ring, etc. In contrast, a "linear alkene" refers to an alkene positioned within a chain structure having a terminating end, such as a carbon chain. In some embodiments, at least one monomer or oligomer is a cyclic alkene, for example, a strained cyclic alkene such as a substituted or unsubstituted cyclobutene or norbornene. Here, the term "unsubstituted" is used in its art-recognized sense to refer to a molecule bearing only hydrogen atom substituents.

In some embodiments, each linear alkene has a main chain (e.g., not including substituents) of between 2 to 20 carbons, for example, 2 to 10 carbons. As used herein, the term "main chain" refers to the longest carbon chain including the largest possible number of alkene carbons in the monomer or oligomer. In some embodiments, each cyclic alkene has an alkene ring including between 4 to 20 carbons, for example, 4 to 10 carbons. As used herein, the term "alkene ring" refers to the largest ring including both carbons of an alkene group, including bicyclic systems and bridging atoms, and excluding linear substituents.

The position of each alkene functional group or compatible functional group is not particularly limited, and may be independently selected. In some embodiments, for example, the alkene group may be at a terminal position in a chain (e.g., in a vinyl or α-position between carbons 1 and 2), or at an internal position (e.g., not at a terminal end). The internal alkene may be a cis-alkene or a trans-alkene. In some embodiments, the alkene may be positioned at a non-branching position (e.g., so that the alkene is disubstituted and includes one substituent on each side of the alkene). In some embodiments, the alkene may be positioned at a branching position (e.g., so that the alkene includes more than two substituents). However, it is understood that the reactivity of each alkene may be affected by the position or geometry of the alkene, and those of skill in the art are capable of selecting suitable alkene positions based on the desired polymerization reaction, product polymer, and the principles described herein.

As used herein, the term "reactivity" refers to the patterns and characteristics of the reaction that a functional group, reactant, or reagent participates in, and may refer to, for example, the chemical mechanism, the reaction rate(s), steric factors, electronic factors, stereochemistry, the energetic favorability (exothermicity vs. endothermicity) of the reaction, reversibility, equilibrium constants, yield, competing and/or side reactions, etc.

In some embodiments, the alkene may be positioned at a non-branching position. In some embodiments, at least one monomer or oligomer may be a cyclic alkene or cyclic dialkene (diene), for example, a monomer or oligomer including a cyclobutene, cyclopentene (cyclopentadiene), cyclohexene, cycloheptene, cyclooctene (cyclooctadiene), norbornene, or a bicyclo[2.2.2]octane moiety.

When the monomer or oligomer includes an alkene-compatible functional group, the compatible functional group may be at a terminal position or at an internal position. In some embodiments, the alkene compatible functional group may be capable of reacting with an alkene functional group included on another monomer, oligomer, or polymer chain. In some embodiments, the alkene compatible functional group may be capable of reacting with a reactive functional group at the end of a polymer chain, such as a free radical, carbocation, or carbanion. Non-limiting examples of the alkene compatible functional group may include an ester group, an amine group, an alcohol group, a halogen group, a silyl hydride group, and combinations thereof.

Each monomer or oligomer may include one or more substituent groups (side chains) on the main chain or on the cyclic ring. The position, multiplicity, and/or type or kind of substituents are not particularly limited as long as they do not impede the polymerization reaction, for example, by creating steric hindrance that prevents or slows association of polymer-forming reactants, or by electronically deactivating the functional groups. In some embodiments, for example, when the monomer or oligomer is linear, a monomer or oligomer may include between 1 to 2n-2x+2 substituents, where n is the number of carbons in the main chain and x is the number of alkene bonds. When the monomer or oligomer is cyclic, a monomer or oligomer may include between 1 to 2n-2x substituents, where n and x are the same as above. In some embodiments, the linear monomer or oligomer may include between 1 to 2n+2 substituents or the cyclic monomer or oligomer may include between 1 to 2n substituents, where n is the same as above and the alkene groups are not tri- or tetra-substituted. Non-limiting examples of the substituent groups may include alkane groups, alkene group, alkyne groups, aryl groups, heteroaryl groups, amino groups, alcohol groups, sulfide groups, carboxylate groups, ester groups, ether groups, amide groups, cyano groups, halogen groups, etc. When a substituent group is an alkane group, the alkane group may be a substituted or unsubstituted linear, branched, or cyclic alkyl group. When the substituent group is a substituted alkane group, the substituent on the alkane group may be the same as described above.

In some embodiments, when the olefin polymer is produced via ROMP mediated by a Grubbs-type metathesis catalyst, the monomers and oligomers do not include any alkene functional group substituents (e.g., the alkenes are not tri- or tetra-substituted).

In some embodiments, the substituent group(s) may be selected so as not to cross-react with the alkenes involved in forming the polymer backbone. In some embodiments, for example, the substituent group(s) may be unsubstituted alkane groups. Non-limiting examples of such unsubstituted alkane groups may include a methyl group, an ethyl group, a propyl group, a butyl group, an octyl group, a decyl group, etc., an isopropyl group, a tert-butyl group, a sec-butyl group, a neopentyl group, etc., a cyclobutyl group, a cyclopentyl group, a cyclohexyl group, a cycloheptyl group, a norbornyl group, an adamantyl group, etc.

In some embodiments, the substituent group(s) may be selected so that they are capable of reacting to form cross-links between different regions of the polymer backbone. In some embodiments, the substituent groups are not cross-reactive with the alkenes involved in forming the polymer backbone, and in some embodiments, may simply react with the alkenes at a slower rate than the main chain-forming polymerization reaction, such that the polymerization reaction outcompetes the reaction of the substituent group with the alkenes. Non-limiting examples of cross-linking substituent groups may include thiol groups and nucleophile and electrophile combinations (such as amino groups and carboxylate groups, aldehyde groups and alcohol groups, amino groups and epoxy groups, etc.). The cross-linking reaction may be induced by, for example, UV light, heat, pressure, radiation, acid, base, or a combination thereof.

In some embodiments, the cross-linking reaction is directly between functional group-substituted side chains. In some embodiments, the cross-linking reaction is mediated by additional cross-linker molecules including two or more functional groups capable of reacting with the functional group-substituted side chains, thereby acting as an intermediary bridge between side chains. For example, the cross-linker molecule may be an alkyl chain or an aryl (benzene) ring substituted with two such functional groups. The functional groups included on the cross-linker molecule are compatible with the functional groups on the side chains, and may be the same as described therein.

Those having ordinary skill in the art are capable of selecting suitable substituent groups and/or cross-linker molecules based on the intended use of the polymer product and its characteristics. For example, the monomers and oligomers may include one or more alkane substituent groups in order to increase the hydrophobicity of the material, and/or less sterically hindering groups to increase the packing and therefore the density and hardness of the material. As another example, the concentration of cross-linking functional groups may be selected according to the desired concentration of cross-linkages, and hence the strength of the polymer.

Non-limiting examples of monomers and oligomers for forming the olefin polymer may include substituted and unsubstituted cyclooctene, norbornene, cyclobutene, cyclopentene, cyclopentadiene, cyclooctadiene, etc., where the monomers and oligomers may be substituted at any position other than the alkene bond. Additional examples of monomers and oligomers can be found in the disclosure of U.S. Pat. No. 9,207,532, titled "Photoinitiated olefin metathesis polymerization", the entire content of which is incorporated herein by reference and attached hereto as an Appendix. However, embodiments of the present disclosure are not limited thereto, and it is understood that those having ordinary skill in the art are capable of selecting alternative monomers and oligomers according to the principles described herein.

In some embodiments, as described above, one or more polymerization reactions may be controlled or modulated by UV light, such that the catalyst, monomers, and oligomers for forming the olefin polymer may be provided as a polymer precursor solution for use with a rapid prototyping approach. For example, the UV-controlled polymerization reaction may be the underlying chemical mechanism enabling 3D printing and/or stereolithography of orthodontic aligners according to embodiments of the present disclosure.

In some embodiments, when one or more polymerization reactions of the polymer precursor solution may be controlled or modulated by UV light, the polymerization reaction may be initiated and allowed to partially progress (pre-reacted) before being subjected to UV control. For example, when the reaction is controlled by addition of an inhibitor (or quenching agent) that slows the polymerization reaction under dark conditions (but which inhibitor is inactive under UV irradiation), the reaction may be started without the inhibitor, and the inhibitor may be added after a suitable amount of time to slow or stop the reaction before completion. Subsequent UV irradiation would then inactivate the inhibitor, and allow the reaction to progress to completion. As used herein, the term "partially progress" may refer to any reaction yield of less than 100%, as calculated with respect to the theoretical yield, or any reaction state in which the portion of remaining monomer or oligomer reactants is greater than 0%, as calculated with respect to the initial concentration. In some embodiments, the term "partially progress" may refer to a remaining reactant concentration of greater than 50%, for example, greater than 40%, 30%, 20%, or 10%. The time of initial polymerization is not particularly limited, and may be selected with respect to, for example, a desired remaining reactant concentration or the viscosity or other characteristic of the reaction. For example, the time of initial polymerization may be about 1 to about 10 seconds, or about 10 seconds to about 1 minute, or about 1 minute to about 5 minutes, etc.

The solvent used for the polymerization reaction and/or polymer precursor solution is not particularly limited. Non-limiting examples of the solvent may include hydrocarbons (such as pentane, hexane, heptane, benzene, toluene, etc.), chlorinated solvents (such as $CH_2Cl_2$, $CHCl_3$, dichloroethane, PhCl, etc.), ethers (such as diethyl ether, methyl tert-butyl ether, THF, etc.), acetates (such as ethyl acetate, acetic acid, isopropyl acetate, etc.), alcohols (methanol, isopropanol, butanol, etc.), acetone, water, DMSO, DMF, acetonitrile, pyridine, and mixtures thereof. In some embodiments, the solvent may be cyclohexane, toluene, or $CH_2Cl_2$. In some embodiments, when the monomer and/or oligomers are liquid at reaction temperature and are provided in suitable volumes, the monomer and/or oligomers may act as the solvent.

In some embodiments, for example when the catalyst or a reaction intermediate is sensitive to side reaction with water, the reaction may be carried out in dry, water-free conditions. As used herein, the term "water-free conditions" refers to a reaction environment (including the container, solvent, and atmosphere) that does not include a detectable amount of water, includes water as a minor or trace contaminant, or includes water at less than about 10 ppm, for example, less than about 5 ppm or less than about 1 ppm. However, embodiments of the present disclosure are not limited thereto. In some embodiments, for example when the polymerization reaction is run under ambient air, the reaction intermediate may include water at or near atmospheric levels (e.g., about 25,000 ppm), and in some embodiments, the polymerization reaction may be run in a solvent including water.

In some embodiments, for example when the catalyst or a reaction intermediate is sensitive to side reaction with oxygen, the reaction (e.g., reaction solvent) may be degassed and carried out under a non-oxygen containing atmosphere such as $N_2$, He, Ar, or mixtures thereof. As used herein, the terms "non-oxygen containing atmosphere" and "non-oxygen atmosphere" refer to an atmosphere or condition that does not include a detectable amount of oxygen, includes oxygen as a minor or trace contaminant, or includes oxygen at less than about 10 ppm, for example, less than about 5 ppm or less than about 1 ppm. In some embodiments, the reaction may be partially degassed. As used herein, the term "partially degassed" may refer to any concentration of oxygen that is less than the standard concentration of oxygen in the solvent under ambient conditions, which can be calculated from the oxygen partial pressure and $K_{sp}$ associated with that solvent. In some embodiments, the reaction may be carried out under ambient conditions.

The use of 3D printing to manufacture orthodontic aligners has traditionally been limited by the characteristics of the available compatible polymers. Few of the available 3D printing polymers in the related art are biocompatible and transparent, and many do not have suitable material characteristics for use as orthodontic appliances. For example, most conventional 3D printing polymers are brittle and lack the toughness to withstand biting forces between opposing teeth. Further, 3D printing polymers that have suitable toughness do not have suitable tensile strength and/or modulus for consistently applying the gentle forces to the teeth that are required for realignment. The olefin polymers according to embodiments described herein, however, are more suitable for use in orthodontic aligners, including orthodontic aligners having movable features such as the tab and slot arrangement described according to embodiments of the present disclosure.

In stereolithography and some types of 3D printing, a polymer precursor solution for forming a polymer is provided as a liquid-filled reservoir. Thin layers of the polymer can be photopolymerized (e.g., cured) and deposited in succession when the polymer precursor solution is exposed to UV light, such that the cumulative layers form the printed object. The light is typically applied to the solution from above or below the reservoir. As such, in some embodiments, the polymer precursor solution for forming the olefin polymer for orthodontic aligners according to embodiments of the present disclosure may further include a blocking agent or UV absorbing agent. The blocking agent or UV absorbing agent limits transmission of the UV light to a short depth within the precursor solution so that layers having a predetermined and consistent thickness can be formed even though the reservoir is hundreds or thousands of layers deep. In some embodiments, for example, the blocking agent or UV absorbing agent may absorb the UV light according to the depth-dependent behavior described by Beer's Law. Typically, the object being formed is positioned a layer thickness away from the edge of the reservoir, such that each layer deposition step polymerizes the layer of polymer precursor solution between the object and the edge of the reservoir. In some embodiments, the resulting thickness of the layers may be about 50 microns to about 200 microns (e.g., the depth resolution of the object may be about 50 microns to about 200 microns). In some embodiments, the thickness of the layers may be about 100 microns to about 150 microns.

The blocking agent or UV absorbing agent may be any suitable blocking agent or UV absorbing agent available in the art. For example, the blocking agent or UV absorbing agent may have a UV absorption spectrum having strong absorption peaks at the wavelengths that are used to activate the polymerization catalyst. Without being limited by any mechanism or theory, the blocking agent or UV absorbing agent may absorb the UV light so that activation of the catalyst is limited or reduced. In some embodiments, the blocking agent may also act as an optical brightener, which may improve the color tint and appearance of the orthodontic aligner. For example, the blocking agent or UV absorbing agent may be a substance such as Tinopal® OB CO or Tinuvin® (both available from BASF, Florham Park, N.J.).

In some embodiments, when the polymerization reactions of the polymer precursor solution are modulated in response to UV irradiation by an inhibitor (or quenching agent), the inhibitor may also serve as a blocking agent or UV absorbing agent. For example, the inhibitor and/or one or more intermediate states of the inhibitor may be capable of modulating the rate of reaction and simultaneously absorbing UV light according to Beer's law.

The concentration of the blocking agent in the polymer precursor solution is not particularly limited, and may be any suitable concentration. In some embodiments, for example, the concentration of blocking agent in the precursor solution may be about 0.01 vol % to about 0.1 vol %, for example, about 0.02 vol % to about 0.06 vol %, or about 0.04 vol %. Those having skill in the art are capable of selecting a suitable concentration based on the desired thickness of the deposited layers and other reaction or printing parameters.

In some embodiments, the polymer precursor solution may further include additional additives to modify the material characteristics of the final polymer. For example, the polymer precursor solution may further include a plasticizer to increase the flexibility and durability of the final polymer. Non-limiting examples of such plasticizers may include silicone oil and other silicone or silicone derivative materials. As another example, the polymer precursor solution may further include an anti-plasticizer to increase the modulus of the final polymer. Those having skill in the art are capable of selecting suitable additives and concentrations thereof based on the desired properties of the finished polymer and appliance (e.g., orthodontic aligner).

The structure and composition of the finished olefin polymer product may be determined by the reaction conditions, monomers, oligomers, catalyst, additives, etc., as described above. For example, the structure of the polymer backbone, including the length of any alkane chains and the presence of any cyclic groups and heteroatoms on the backbone, may be determined by the particular monomers and/or oligomers used in the polymer precursor solution as described above. As another example, the substituents included on the polymer backbone may be determined by the substituents included on the monomers and oligomers used in the polymer precursor solution, and may therefore be the same as described above. Those having ordinary skill in the art are capable of correlating the structure of the finished olefin polymer product with the structures of the monomers and oligomers used in the polymer precursor solution, and selecting the structures of the monomers and oligomers to yield an olefin polymer product having a suitable structure, composition, and material properties for an orthodontic aligner according to embodiments of the present disclosure.

In some embodiments, the finished polyolefin product may be further processed to induce cross-linking, as described above. The amount or percentage of crosslinking is not particularly limited, and may be selected according to desired material characteristics, such as the hardness or modulus of the polymer material.

In some embodiments, a polymer may be formed by reacting 1,5-cyclooctadiene (COD) and 5-ethylidene-2-norbornene (ENBE) in degassed (e.g., oxygen-free) solvent (for example, dichloromethane) in the presence of a Grubbs-type catalyst that is reactive for ROMP (e.g., UV-activated ROMP). In some embodiments, a polymer may be formed by reacting 1,5-cyclooctadiene and 5-ethylidene-2-norbornene in degassed solvent in the presence of a Grubbs-type catalyst that is reactive for ROMP and includes a carbene ligand derived from ethyl vinyl ether as the ligand that renders the catalyst UV-activated. In some embodiments, the catalyst may be included in an amount of about 0.05 wt % to about 0.5 wt % based on the total weight of reactants, for example, about 0.02 wt % to about 0.2 wt % or about 0.05 wt % to about 0.1 wt %. In some embodiments, the catalyst may be UV-activated at wavelengths of about 254 nm, about 352 nm, about 385 nm, and/or about 405 nm, and may be irradiated with a mercury arc lamp. In some embodiments, the volume ratio of COD to 5-ethylidene-2-norbornene may be about 0.5:10 to about 10:10, for example, 1:10 to about 5:10, or about 1:10 to about 2:10.

In some embodiments, a polymer may be formed by reacting 1,5-cyclooctadiene (COD) and dicyclopentadiene using substantially the same catalyst, UV-wavelengths, and amounts as described in connection with the polymer(s) formed by reacting COD and 5-ethylidene-2-norbornene.

In some embodiments, a polymer may be formed by reacting any one of COD, dicyclopentadiene, and 5-ethylidene-2-norbornene by itself using substantially the same catalyst, UV-wavelengths, and catalyst amount as described in connection with the polymer(s) formed by reacting COD and 5-ethylidene-2-norbornene.

In some embodiments, the polymer may be pre-reacted before being subjected to UV control, as described in connection with the polymer precursor solution. In some embodiments, for example, the polymer may be partially formed by first pre-reacting the polymer precursor solution without an inhibitor, and the inhibitor may be added after a suitable amount of time.

In some embodiments, the polymer formed by reacting COD and 5-ethylidene-2-norbornene may be formed under oxygen-free conditions by mixing COD and the Grubbs-type catalyst, allowing the COD to polymerize for about 5 seconds to about 1 minute, and then adding ethyl vinyl ether to the mixture in order to quench the reaction and convert the catalyst into a UV-activated catalyst. After sonicating the initial COD-derived polymer and removing volatile side products under vacuum, the resulting reaction composition may be dissolved in 5-ethylidene-2-norbornene. The reaction composition may be subsequently irradiated with UV light at a wavelength of about 200 nm to about 460 nm, for example at about 254 nm, about 352 nm, and/or about 405 nm to activate the catalyst and thereby form the polymer. In some embodiments, the reaction composition including polymerized COD dissolved in 5-ethylidene-2-norbornene is further mixed with a blocking agent and optional additives, and then placed in a rapid prototyping machine for UV-activated deposition to form an orthodontic aligner, as described above.

In some embodiments, the dental or orthodontic appliance may be fabricated from a combination of (e.g., by combining) two or more dental-compatible polymers (e.g., olefin polymers). For example, the olefin polymer may include two or more types or kinds of polymers, each having a different composition and structure. Each olefin polymer may be formed from a respective polymer precursor solution including a monomer or oligomer, a catalyst, and a UV absorbing agent, as described above. The orthodontic appliance is thus formed via one or more reactions of each polymer precursor solution to controllably deposit the corresponding polymers. The structures and compositions of the polymer precursor solutions and polymers may be the same as described above.

In some embodiments, the two or more dental-compatible olefin polymers may each have different (e.g., distinct) mechanical properties. For example, the two or more dental-compatible olefin polymers may have different hardnesses, densities, strengths, and/or elasticities. In some embodiments, a first dental-compatible olefin polymer may be relatively hard, compared to a second dental-compatible olefin polymer that is softer. The dental-compatible olefin polymers having different mechanical properties may be combined in order to yield a dental or orthodontic appliance having a combination of material properties in different regions, and/or intermediate material properties.

In some embodiments, for example, the two or more dental-compatible olefin polymers may be deposited and combined in layers that are layered together or stacked to create (form) the appliance. For example, a layer of a first dental-compatible olefin polymer may be deposited, followed by a layer of a second dental-compatible olefin polymer, etc., with the layering process repeated, as needed, to complete the appliance. In some embodiments, such layering may be accomplished by moving the appliance between different printing devices, each set up to deposit a particular polymer, and curing or partially curing each deposited layer of polymer before moving the appliance to the next printing device. In some embodiments, such layering may be accomplished using a printing device equipped with two polymer precursor solutions (inks) that can be switched out as necessary. However, embodiments of the present disclosure are not limited thereto.

In some embodiments, the two or more dental-compatible olefin polymers may be deposited in different regions of the appliance. For example, a first dental-compatible olefin polymer having a first set of material properties may be deposited to form a tooth-clasping arrangement (region) in the appliance, and a second dental-compatible olefin polymer having a second set of material properties may be deposited to form a flexible arrangement (region) in the appliance, which may be connected to but distinct from the tooth-clasping arrangement (region). As another example, a first dental-compatible olefin polymer having a first set of material properties may be deposited to form a tooth-clasping arrangement in the appliance, and a second dental-compatible olefin polymer having a second set of material properties may be deposited to form one or more flexible interconnecting elements in the appliance, which may be curved and connected to but distinct from the tooth-clasping arrangement. Partial and/or overlapping layers may be deposited by each printing device in order to print an appliance having a combination of materials within the same vertical layer. Additional details are described below in connection with methods of fabricating an orthodontic appliance.

The different regions formed of two or more dental-compatible olefin polymers may be stably connected in order to maintain structural integrity. In some embodiments, the dental-compatible olefin polymers may be partially cured during deposition of each to thereby maintain a concentration of unreacted polymerizable functional groups in each material, such that unreacted groups on each side of the boundary between the regions are available to cross-link across the boundary during further curing (e.g., UV, thermal, and/or chemical curing). Further, the functional groups available to cross-link across the boundary may be specifically selected to be chemically reactive (compatible) with each other, as described herein. In some embodiments, the two or more dental-compatible olefin polymers may be deposited in a shape or configuration that increases the surface area of the boundary between the different polymers to thereby stabilize the physical configuration of the two surfaces via one or more intermolecular reactions, hydrogen bonds, van der Waals interactions, friction, interlocking or embedded parts, etc. For example, the surface area of the boundary may include physically complementary shapes or textures (such as sawtooth or sinusoidal shapes), a microstructure or micro-scale texture that provides increased roughness, an interlocking mesh or fibers of one polymer embedded in a solid mass of a second polymer, etc.

The term "microstructure" is used herein to refer to structural features that are viewable only under an optical microscope at about 25× to about 100× magnification. Such structural features may include shapes, pores, inclusions, etc. on the surface area of the boundary between olefin polymers.

Additional aspects of embodiments of the present disclosure are directed toward a method of fabricating an orthodontic appliance from the olefin polymer(s) described herein.

FIG. 1 is a schematic block diagram illustrating an example of a system 100 for fabricating a dental appliance 114. The example system 100 includes an impression system 102, an appliance design system 106, an appliance fabrication system 112, and a server 116. Although alternatives are possible, the components of the system 100 can all be located in a dental or orthodontic office, in which patients receive orthodontic treatment. For example, at least some of the components illustrated in FIG. 1 can be disposed in a dental or orthodontic laboratory. In some embodiments, two or more of the impression system 102, appliance design system 106, and appliance fabrication system 112 are combined in a single device. In some embodiments, two or more of the impression system 102, an appliance design system 106, an appliance fabrication system 112 are all connected to the same wireless local area network and communicate with each other using a wireless communication protocol without accessing the Internet.

The example impression station 100 generates a digital (virtual) dental model 104 of the dentition of a patient. The digital dental model 104 is a geometric representation of the dentition of the patient. In some embodiments, the digital dental model 104 is represented by one or more of a point cloud, a polygonal mesh, a parametric model, or voxel data. Although alternatives are possible, the digital dental model 104 can be generated directly from the dentition of the patient, using, for example, an intraoral scanner. Example intraoral scanners include, for example, the TRIOS Intra Oral Digital Scanner, the Lava Chairside Oral Scanner C.O.S., the Cadent iTero, the Cerec AC, the Cyrtina IntraOral Scanner, the Lythos Digital Impression System from Ormco, and the Dental Wings Intraoral Scanner.

In some embodiments, a digital dental model 104 is generated using other imaging technologies, such as computed tomography (CT) or magnetic resonance imaging (MRI). In yet other embodiments, the digital dental model 104 is generated from a physical impression. In some embodiments, physical impressions are captured using an impression material, such as sodium alginate, vinyl polysiloxane, or another type of impression material. The digital dental model 104 is then generated by scanning either the physical impression or a plaster model of the dentition of the patient created from the physical impression. Non-limiting examples of technologies for scanning a physical impression or model include three-dimensional laser scanners and computed tomography (CT) scanners.

The appliance design system 106 is a system that generates an appliance model 110 (e.g., virtual appliance) based on the digital dental model 104. In some embodiments, the appliance design system 106 includes a computing device including user input devices. The appliance design system 106 includes an appliance design engine 108. The appliance design engine 108 may generate a treatment plan, and generate an appliance model 110 based on that treatment plan that is transmitted to the appliance fabrication system 112 for fabrication. As used herein, the term "virtual appliance" refers to an appliance model that is described and transmitted in a digital format encoding the size, dimensions, and structure of the appliance, for example, as a CAD drawing or mesh-based file such as an .STL file. However, embodiments of the present disclosure are not limited thereto, and the virtual appliance may be described and transmitted in any suitable available format.

The appliance model 110 can include one or more three-dimensional models of dental appliances. In some embodiments, the appliance model 110 includes a three-dimensional upper model for the patient's upper dentition and a three-dimensional model lower model for the patient's lower dentition. In some embodiments, the appliance model 110 includes three-dimensional models for a series of orthodontic aligners that are configured to incrementally move the patient's target teeth to a target position. In some embodiments, the appliance model 110 is represented by one or more of a point cloud, a polygonal mesh, a parametric model, or voxel data.

In addition to the appliance model 110, the appliance design engine 108 may also generate other appliance design data. For example, the appliance design engine 108 can also generate appliance design data that includes incremental positions and target tooth positions for the patient. In some embodiments, the appliance design engine 108 then access this data at a later point in the patient's treatment, for example, to aid in evaluating treatment progress, to modify the treatment plan, or to generate additional appliance models. Additionally, the appliance design engine 108 can also generate appliance design data that includes information about structural elements such as size, shape, orientation, and position for one or more bonded attachments that are to be bonded to the patient's teeth during treatment. In some embodiments, the appliance model 110 is formed to fit to these bonded attachments to aid in moving some of the patient's teeth. In some embodiments, the appliance design data generated by the appliance design engine 108 is stored locally on the appliance design system or on the server 116, where the data can be accessed during future appointments with the patient.

In some embodiments, the appliance design engine 108 segments the digital dental model 104 into component models corresponding to the patient's teeth, aligns the component models to generate a treatment plan, and forms an appliance design. In some embodiments, these steps are automated as described further below. Additionally, in some embodiments, the appliance design engine 108 generates user interfaces through which a user can provide input to control at least some of these steps.

As noted above, the appliance design engine 108 can define incremental tooth positions based on the current positions of the teeth as reflected in the digital dental model 104 and the determined target tooth positions. In some embodiments, the incremental tooth positions are based on simulation using a physics model of orthodontic treatment. Then the appliance design engine 108 can generate an appliance model 110 that includes three-dimensional shape data that represents an orthodontic appliance for at least one of the incremental tooth positions in a format suitable for fabrication using the appliance fabrication station 2120.

Although alternatives are possible, the appliance design engine 108 typically includes computer-aided-design (CAD) software that generates a graphical display of one or both of the digital dental model 104 and the appliance model 110 and allows an operator to interact with and manipulate one or both of the digital dental model 104 and the appliance model 110.

The appliance design engine 108 can also include digital tools that mimic the tools used by a laboratory technician to physically plan a treatment and design a dental appliance. The appliance design engine 108 can also include tools to add and/or modify features of the appliance design, such as loops, tabs, slots, flexible zones, holes, attachments and/or so forth.

Once the appliance model 110 is designed using the appliance design engine 108, the appliance model 110 is sent to the appliance fabrication system 112 where the appliance 114 is produced. In some embodiments, multiple(s) of the appliance model(s) 110 are generated that correspond to multiple incremental tooth positions (e.g., the first two incremental tooth positions) and used to fabricate multiple of the appliance 114. The patient is then given the multiple appliances for multiple sequential stages of incremental tooth movement. The patient will then receive additional appliances for additional incremental tooth movement during follow-up appointments. The additional appliances may be generated from the original digital dental model 104 or may be generated based on an updated digital dental model 104 that is acquired during a follow-up appointment using the impression system 102. In this manner, the system 100 can allow for adjustment of the treatment plan and the incremental tooth positions within the treatment plan during follow-up visits (e.g., when one or more teeth are moving more slowly than originally anticipated).

Although alternatives are possible, the appliance fabrication system 112 typically includes one or more rapid fabrication machines. Rapid fabrication machines produce physical parts such as the dental appliances described herein in a short amount of time compared to traditional fabrication processes, such as less than 20 minutes, 30 minutes, 1 hour, 2 hours, or 4 hours. Non-limiting examples of the rapid fabrication machines include three-dimensional printers, such as the ProJet line of printers from 3D Systems, Inc. of Rock Hill, S.C. Another example of a rapid fabrication machine is stereolithography equipment. Still another example of a rapid fabrication machine is a digital light processing (DLP) rapid prototyping system, such as the Perfactory system from EnvisionTEC, Inc. of Dearborn, Mich. Yet another example of a rapid fabrication machine is a milling device, such as a computer numerically controlled (CNC) milling device. In some embodiments, the appliance fabrication system 112 is configured to receive files in the stereolithography (.STL) file format. In some embodiments, the appliance fabrication system 112 includes milling equipment for milling a biocompatible plastic material that can be placed in the patient's mouth. In these embodiments, the appliances 114 are milled from a biocompatible plastic material.

The impression system 102, appliance design engine 108, appliance fabrication system 112, and server 116 may communicate with each other over a network. The network 118 is an electronic communication network. An electronic communication network is a set of computing devices and links between the computing devices. The computing devices in the network use the links to enable communication among the computing devices in the network. The network 118 can include routers, switches, mobile access points, bridges, hubs, intrusion detection devices, storage devices, standalone server devices, blade server devices, sensors, desktop computers, firewall devices, laptop computers, handheld computers, mobile telephones, and other types of computing devices.

In some embodiments, the network 118 includes various types of links. For example, the network 118 can include one or both of wired and wireless links, including Bluetooth, ultra-wideband (UWB), 802.11, ZigBee, and other types of wireless links. Furthermore, in some embodiments, the network 118 is implemented at various scales. For example, the network 118 can be implemented as one or more local area networks (LANs), metropolitan area networks, subnets, wide area networks (such as the Internet), or can be implemented at another scale.

Figure 2:
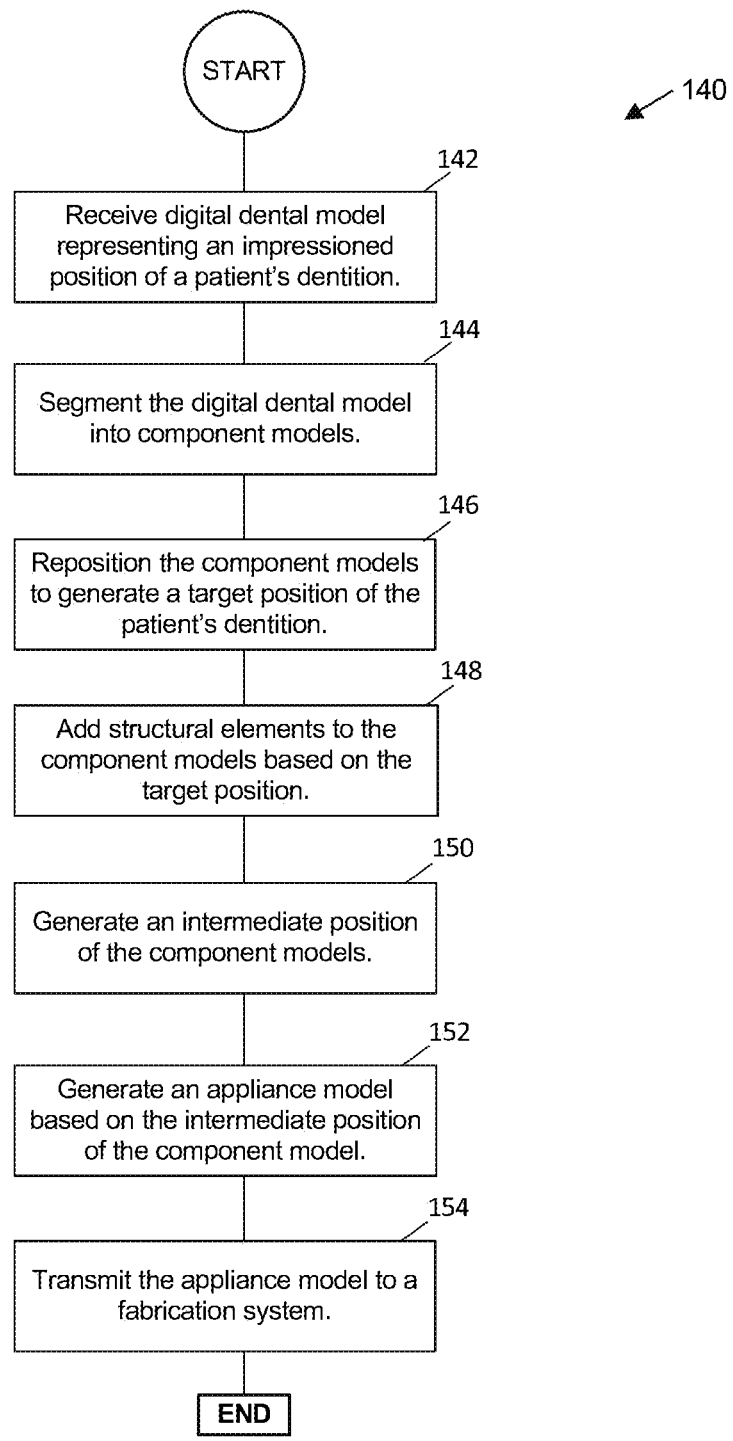
FIG. 2 is a flow chart illustrating an example method of designing an appliance performed by embodiments of the system of FIG. 1.

FIG. 2 is a flow chart illustrating an example method 140 of designing an appliance. The method 140 is performed by embodiments of the appliance design engine 108.

At operation 142, a digital dental model is received. In some embodiments, the digital model represents an impressioned position of a patient's dentition as captured by the impression system 102.

At operation 144, the digital dental model is segmented into component models. For example, the component models can represent individual teeth. In some embodiments, in addition to separating the individual dental models from each other, the component models are also separated from gingival tissue. Examples techniques for segmenting the digital dental model are described herein.

At operation 146, the component models are repositioned to generate a target position of the patient's teeth. For example, the component models may be aligned. Aligning the component models may comprise closing spaces between adjacent teeth. In some embodiments, a user interface is generated through which an operator can provide input to, at least in part, control the reposition of the component models. Additionally, in some embodiments, physical simulations or machine learning techniques are used to reposition the component models.

At operation 148, structural elements are added to the component models, as necessary, based on the target position. An example of a structural element is a bonded attachment. In some embodiments, a bonded attachment is added to a component model when the component model moves by more than a threshold amount between the impression position and the target position. Additionally, bonded attachments are added in some embodiments based on particular types of movement (e.g., a torque that exceeds a threshold amount). The thresholds can be uniform for all of the component models or can vary based on tooth type or other factors.

Bonded attachments (also referred to as buttons) are structures that are bonded to the surface of one or more of the patient's teeth. The bonded attachments are typically not removable by the patient during the course of active orthodontic treatment. In some embodiments, bonded attachments have straight edges and have square or rectangular shape; however, any shape for the bonded attachment 111 can be used. The bonded attachment may be bonded to one or both of the buccal or lingual surfaces of the patient's teeth.

At operation 150, intermediate positions of the component models are generated. The intermediate positions represent incremental movements of the teeth between the impression position and the target positions.

At operation 152, an appliance design is generated based on an intermediate position of the component models. The appliance design may comprise one or more thin-shells that are configured to fit to a portion of the patient's dentition. The appliance design may also include additional elements such as flexible regions that have mesh structures, connecting loops between thin shells, and tab-and-slot arrangements to close spaces. The additional elements may be added based on the relative positions of the component models, the types of movement that is to occur during the associated movement stage, or other factors.

At operation 154, the appliance model is transmitted to the fabrication system. In some embodiments, multiple appliance models are transmitted to the fabrication system.

Figure 3:
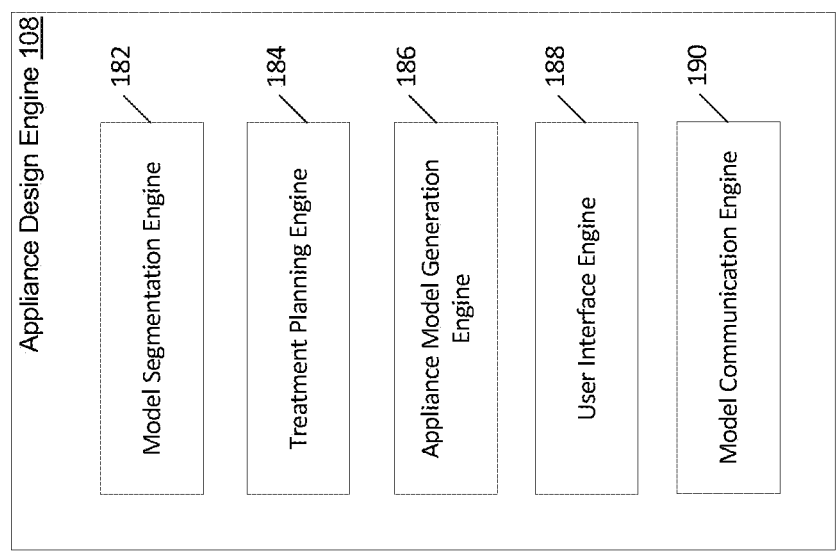
FIG. 3 is a schematic diagram of an example embodiment of the appliance design engine of FIG. 1.

FIG. 3 is a schematic diagram of an example appliance design engine 108. In this example, the appliance design engine 108 includes a model segmentation engine 182, a treatment planning engine 184, an appliance model generation engine 186, a user interface engine 188, and a model communication engine 190.

The model segmentation engine 182 segments a digital dental model into component models. The component models are generated by separating a portion of the digital dental model from the rest of the digital dental model. In some embodiments, the component models include tooth tissue. Additionally, in some embodiments, the component models include tooth tissue and gum tissue. The treatment planning engine 184 generates a treatment plan. In some embodiments, the treatment planning engine 184 may receive user input to define one or more of parameters of the treatment and target tooth positions. In some embodiments, the treatment planning engine 184 generates target tooth positions. Additionally, the treatment planning engine 184 can generate intermediate tooth positions. The appliance model generation engine 186 generates an appliance model based on the component models and the intermediate or target tooth positions. The user interface engine 188 generates user interfaces through which an operator may interact with and control aspects of the application design engine 108. The model communication engine 190 receives and transmits models such as digital dental models and appliance models.

Figure 4:
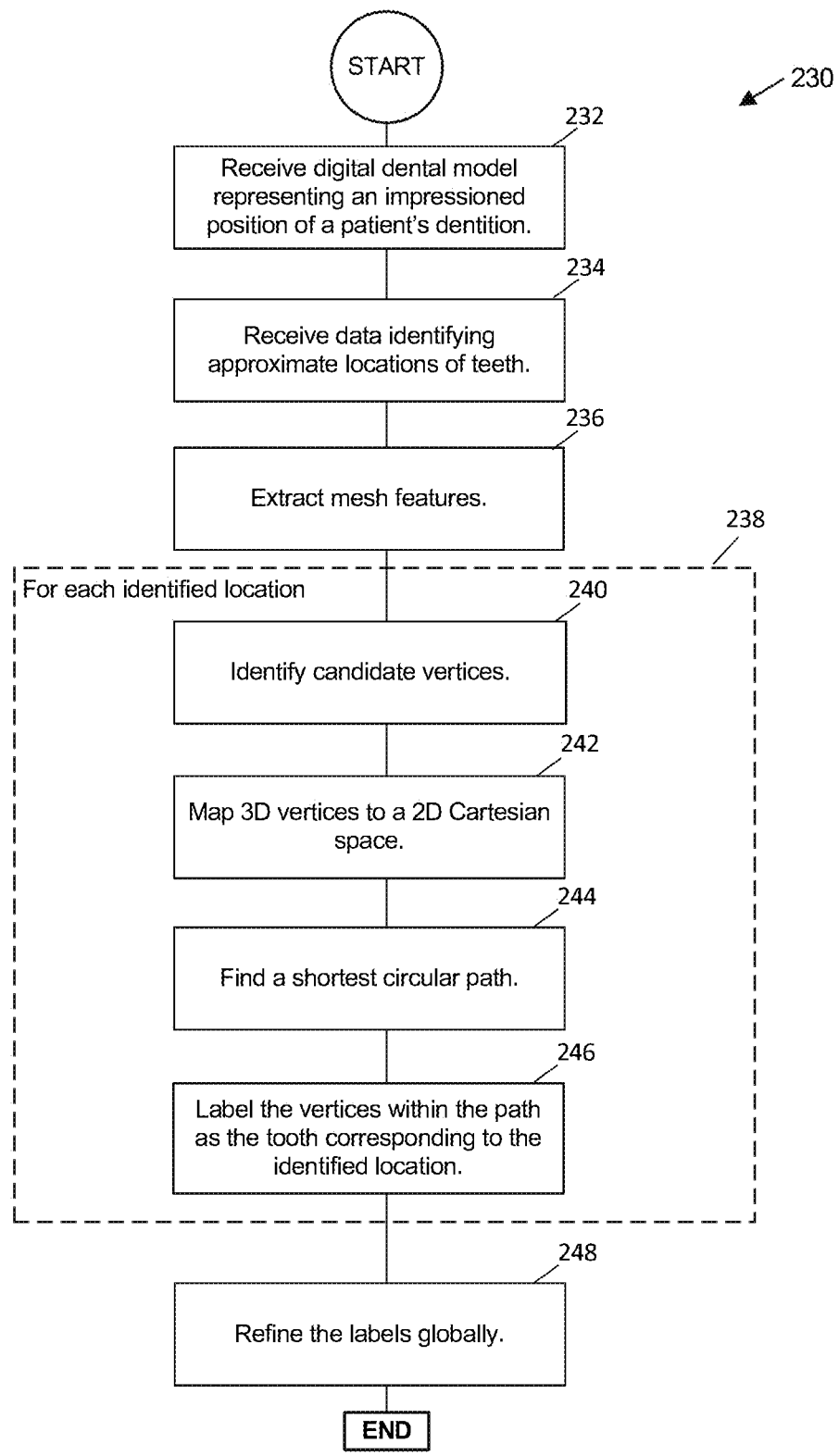
FIG. 4 is a schematic diagram of a method of segmenting a digital dental model performed by embodiments of the appliance design engine of FIG. 1.

FIG. 4 is a schematic diagram of a method of segmenting a digital dental model. The method 230 is performed by embodiments of the appliance design engine 108. For example, the method 230 may be performed by the model segmentation engine 182.

At operation 232, a digital dental model representing an impressioned position of a patient's dentition is received.

The model may be received from via a network. The model may also be received from a file system, database, etc.

At operation 234, data identifying approximate locations of the patient's teeth is received. In some embodiments, the locations are received via a user interface which is configured to receive inputs from the user identifying approximate locations of the teeth. For example, the user interface may display a graphic representation of the dental model and be configured to receive mouse clicks or touch inputs identifying a point on the surface of each of the teeth.

At operation 236, features are extracted from the digital dental model. For example, the digital dental model may be represented as or converted to a mesh comprising vertices and faces. In some embodiments, vertex-wise mean curvature measures with each vertex's curvature are calculated as the averaged bi-plane angles for each pair of neighboring facelets around that vertex. The calculated mean curvature can then be used as clues for separation boundaries between teeth and gum, or between each pair of neighboring teeth. More specifically, in some embodiments, those vertices with large negative mean curvature values are identified as potential boundary vertices. In some embodiments, the operation 236 is performed on individual component (teeth) models rather than on the combined dental model as part of operation 238.

Then, operation 238 is performed for each identified location. In some embodiments, the operation 238 is performed simultaneously for multiple of the identified locations (e.g., using separate processors or separate processors cores). In some embodiments, operation 238 is performed within a loop to sequentially perform the operation 238 on at least some of the identified locations.

The operation 238 performs tooth segmentation on the tooth corresponding to the identified location in the digital dental model. In some embodiments, the operation 238 performs automatic tooth segmentation based on manifold space transforms. Although alternatives are possible, in this example operation 238 includes operations 240, 242, 244, and 246.

At operation 240, candidate vertices are selected for the identified location. For example, some embodiments identify vertices with a certain distance of the identified location as being potentially part of the tooth. In some embodiments, the candidate vertices are selected by looking at those within a limited on-mesh geodesic distance (i.e. distance between two consecutive located points) to the located point. The selection can be carried out using dilation starting from the identified location with a certain number of iterations or until reaching its neighboring identified location.

At operation 242, the identified candidate 3D vertices are mapped to points in a 2D Cartesian space. In some embodiments, local linear embedding is used to perform the mapping. For example, local linear embedding can be used to map the identified candidate 3D vertices identified at operation 240 to a 2D Cartesian space based on 3D distance between the 3D vertices. In some embodiments, the manifold space embedding is based on Hessian or Laplacian.

At operation 244, a shortest circular path is found. Although referred to as a circular path, the path can have other closed loop shapes too. In some embodiments, a polar transformation is performed on the mapped 2D points. For example, using the 2D projection of the identified location as the origin, a polar transform is performed on the 2D projected candidate points. The resulting polar space is then divided by a grid. Each intersection point on the grid is assigned a curvature value, which can be determined by interpolation in 2D Cartesian space on the Delaunay triangulation of the vertices identified by operation 240 or determined by the curvature values of a pre-determined number of nearest neighbor points in the 2D Cartesian space.

Then, a shortest path is found in the polar space such that the path is closed when the path is converted back to the Cartesian space. In some embodiments, dynamic programming is used to find the shortest path. In some embodiments, a branch and bound method is used to find the shortest path.

At operation 246, the vertices within the identified path are labeled as being part of the model of the tooth corresponding to the identified location.

At operation 248, the labels are refined globally. Although alternatives are possible, operation 248 is performed after each identified location has been processed by operation 238. In some embodiments, operation 248 is performed before all of the identified locations are processed by 238 but after a subset of adjacent identified locations are processed by operation 238.

Operation 248 refines the teeth globally in part because treating each teeth tooth individually might result in conflicts. For example, some vertices may be labeled as being parts of two neighboring teeth. In some embodiments, the refinement of segmented teeth is treated as an optimization problem over a probabilistic graph. After segmentation, all points will be assigned with a label (either a specific tooth, which may be represented by the tooth number, or as gum tissue, which may be represented by the number 0). In some embodiments, seed point sets are defined as the region with a same label under certain number times of erosion (for example 5 times). In some embodiments, erosion smooths the boundary of the mesh region labeled for a particular tooth. Any points in the seed point set will be fixed to the label previously assigned. For other points, the probability of assigning any label is the same. Then, in some embodiments, the final refined results are obtained by optimizing this problem using belief propagation or graph cuts.

Figure 5:
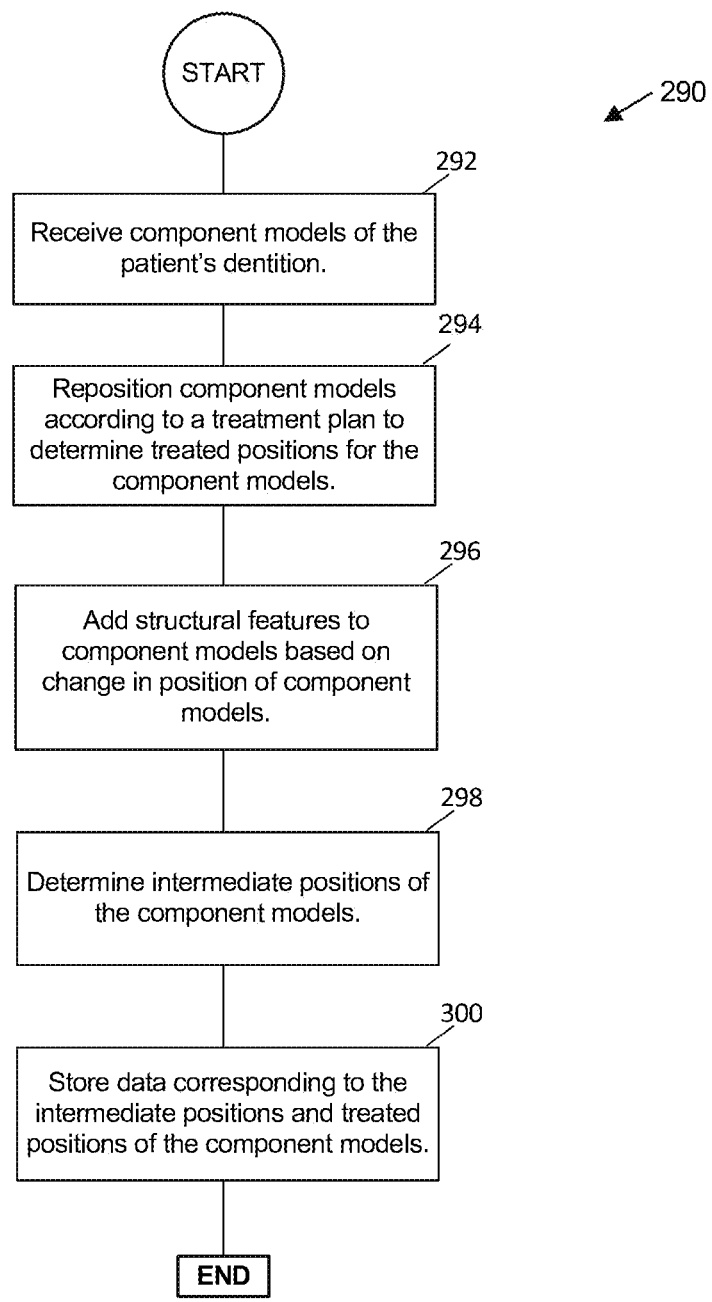
FIG. 5 is a schematic diagram of a method of generating a treatment plan performed by some embodiments of the system of FIG. 1.

FIG. 5 is a schematic diagram of a method 290 of generating a treatment plan. In some embodiments, the method 290 operates on component models generated by segmenting a digital dental model (e.g., the output of method 230) to align the component models into a target post-treatment position. The method 290 is performed by embodiments of the appliance design engine 108. For example, the method 290 may be performed by the treatment planning engine 184.

At operation 292, the component models of the patient's dentition are received. The component models may be generated by the segmentation process described previously. For example, the component models may be generated by forming separate meshes for each of the vertices that are labeled for each tooth. In some embodiments, the component models are received from another computing device such a as a cloud server that performed the segmentation process. The component models can also be received from a database, file system, or elsewhere.

At operation 294, the component models are repositioned according to a treatment plan to determine the target treated positions for the component models. In some embodiments, the component models are repositioned based on inputs received via a user interface. In some embodiments, the component models are repositioned using a physics simulation engine. For examples, the teeth may be modeled using an attractive force that causes their positions to move closer to one another. The models may also be treated as solid models that are unable to intersect (e.g., they bounce off each other when they collide). In some embodiments, the component models are repositioned using a model trained using a machine learning process. The machine learning process may train the model using a plurality of sets of input dental models and resulting target dental models (e.g., aligned dental models). Additionally, in some embodiments, scores are automatically generated for the aligned dental models based on the alignment of the teeth. Some embodiments use the scores in training the machine learning model. Additionally, some embodiments iteratively reposition the teeth to optimize the score. Additionally, some embodiments include rules related to permitted types of movement.

At operation 296, structural elements are added to the component models based on the change in position of component models from the impressioned position to the target treatment position. An example structural element is a bonded attachment. The bonded attachment can come in various shapes such as a rectangular shape. The bonded attachment provides an additional structure on the tooth to which the interior of the dental appliance can be shaped to fit. In some embodiments, the amount of movement and type of movement (e.g., torque or extrusion) of the component models is compared to thresholds to determine whether bonded attachments should be added. Because the bonded attachments and other structural elements are added to the component models so that an appliance model built from the component models will fit to the added structural elements.

In some embodiments, a user interface is presented through which a user may confirm or adjust the locations of the added structural elements. If a bonded attachment is added to the component model, an indication will be presented to the user that a bonded attachment needs to be added to the corresponding tooth at a particular location. For example, in some embodiments, a dental appliance can be used as a bonding tray to guide the placement of the bonded attachments.

At operation 298, intermediate positions are determined for the component models. The intermediate positions correspond to movement stages between the initial position of the teeth as impressioned and the target tooth positions. In some embodiments, the intermediate positions are determined as key frames in the movement path. In some embodiments, the movement path is determined by interpolating between the target and initial position. Additionally, in some embodiments, the movement path is determined using techniques similar to those discussed with respect to repositioning the component models in operation 294. In some embodiments, the intermediate positions are determined based on movement thresholds for the teeth (e.g., the teeth are repositioned along the movement path until one of teeth has been moved by the threshold amount).

At operation 300, data corresponding to the intermediate positions and treated positions of the component models is stored. In some embodiments, additional information about the treatment plan is stored such as information about the position and type of any structural elements that have been added.

Figure 6:
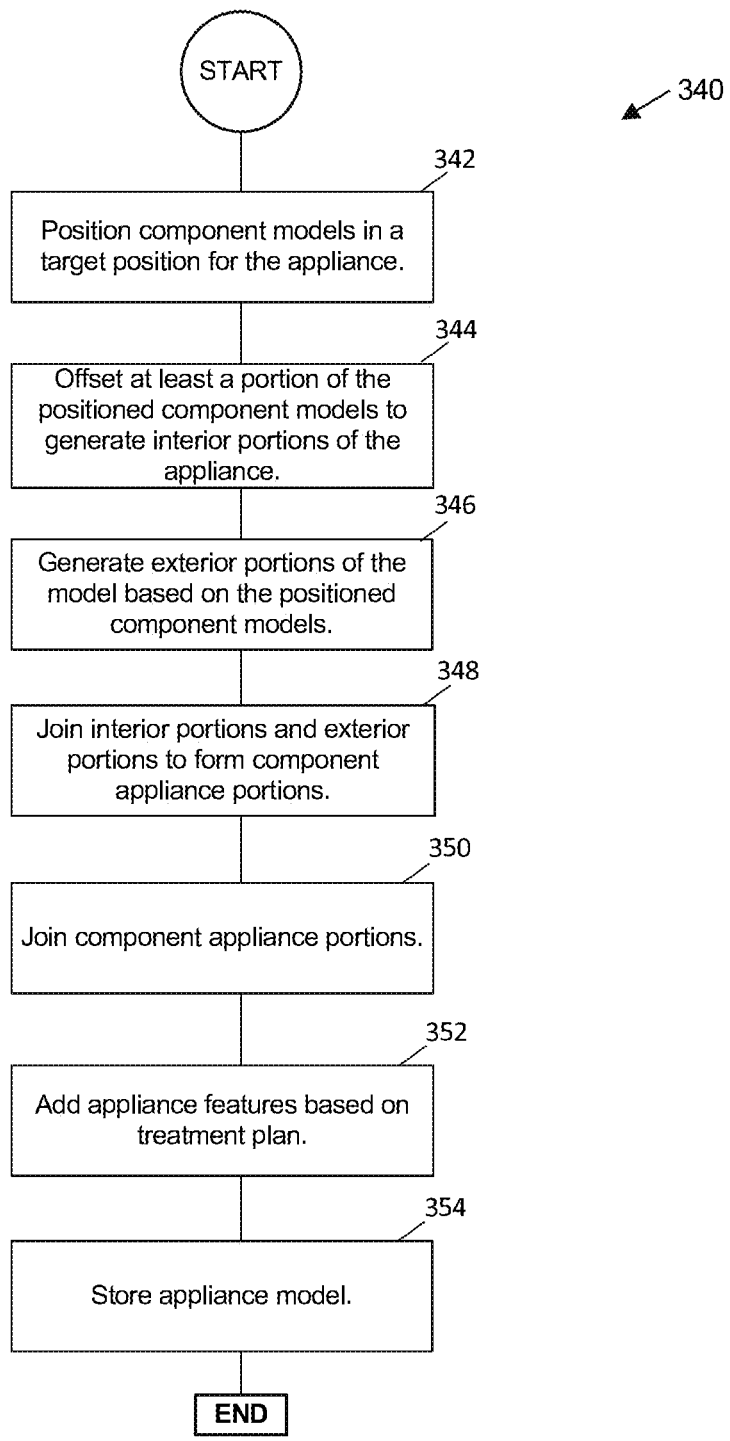
FIG. 6 is a schematic diagram of a method of generating an appliance model performed by some embodiments of the system of FIG. 1.

FIG. 6 is a schematic diagram of a method 340 of generating an appliance model. In some embodiments, the method 340 generates an appliance model based on component models positioned according to either one of the intermediate positions or the target treated position. The method 340 is performed by embodiments of the appliance design engine 108. For example, the method 340 may be performed by the appliance model generation engine 186.

At operation 342, component models are positioned in a target position for the appliance. For example, the target position may be any of the intermediate positions determined by the method 290 or the target treatment position determined by the method 290. Repositioning the component models may comprise changing one or both of the location of the component model and the orientation of the component model.

At operation 344, at least a portion of the positioned component models is offset to generate interior portions of the appliance model. For example, an interior offset of between 0.1 mm and 0.5 mm can be applied to the positioned component models to generate the interior surfaces. As described above, in some embodiments, the component models include additional structural elements such as bonded attachment. In these embodiments, the interior portion is also offset over the additional structural elements.

At operation 346, exterior portions of the appliance model are generated based on the positioned component models. In some embodiments, the exterior portions are generated by offsetting the component models by an exterior offset amount that is greater than the interior offset amount (e.g., 0.1-0.5 mm). In some embodiments, the interior surfaces are offset by a desired thickness of the appliance. The thickness may be determined via a default value, a user input, or based on properties of the treatment plan (e.g., how much the tooth is being moved).

At operation 348, the interior portions and exterior portions are joined to form component appliance portions. In some embodiments, the interior surface and the exterior surface are joined by forming facets connecting the edges of the surfaces. In some embodiments, the edges of one or both of the interior surface and the exterior surface are smoothed before being joined. In this manner, the aesthetics and comfort to the wearer of the resulting appliance may be enhanced.

At operation 350, the component appliance portions are joined. In some embodiments, the component models are joined by generating connecting structures between adjacent appliance portions. For example, the connecting structures can include loop structures. Another example of a connecting structure is a mesh. The connecting structure can also include apertures or tubes through which a connecting wire can be placed. In some embodiments, the component appliance portions are joined at least in part using a union of the individual component appliance portions. In some embodiments, not all of the component appliance portions are joined as a connected model. For example, if a gap between adjacent component models exceeds a predetermined threshold (e.g., due to a missing tooth), the component appliance portions may be joined into multiple disjoint appliance models on sides of the gap. As described further below, a tab and slot arrangement may be added to the separate appliance models to facilitate closing the gap.

At operation 352, appliance features are added to the appliance based on the treatment plan. For example, some embodiments include a tab and slot arrangement to facilitate closing a gap between teeth. A model of a tab may be added to a part of an appliance model and a slot may be added to a separate part of the appliance model. The shape and positioning of the tab and slot may be determined as part of the treatment plan based on the desired tooth movement. Another example of appliance features include patterned regions which may allow for additional flexibility in one or more directions. The patterned regions may be added based on the desired type of tooth movement. Another example of appliance features are receiving structures for bonded attachments or other structural elements added to the component models. For example, a pre-defined structure or parametrically defined structure may be joined to the appliance to interact with a bonded attachment. This added structure may fit the bonded attachment more precisely than interior surface generated using an offset. In addition, to an added structure, some embodiments include an aperture or recess configured to receive the bonded attachment. Some embodiments do not include any additional appliance features and in some embodiments additional appliance features are not included in all appliances.

At operation 354, the appliance model is stored. In some embodiments, multiple models are generated and stored for some or all of the intermediate positions and target treatment positions of the patient's teeth. The appliance models may be stored locally or transmitted to a server for storage.

Figure 7:
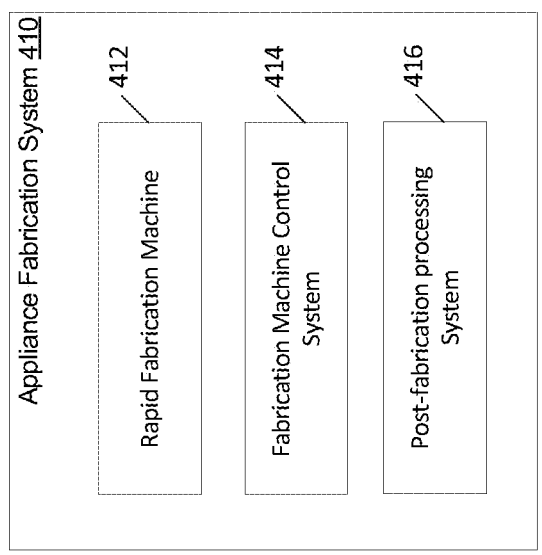
FIG. 7 is a schematic diagram of an example embodiment of the appliance fabrication system of FIG. 1.

FIG. 7 is a schematic diagram of an example appliance fabrication system 410. The appliance fabrication system 410 is an example of the appliance fabrication system 112. In this example, the appliance fabrication system 410 includes a rapid fabrication machine 412, a fabrication machine control system 414, and a post-fabrication processing system 416. Although shown as separate components in this figure, in some embodiments, the fabrication machine control system 414 is a component of the rapid fabrication machine 412.

As described above, the rapid fabrication machine 412 produces three dimensional physical parts based on computer-generated models. Examples of the rapid fabrication machine 412 include, but are not limited to, three-dimensional printers, stereolithography equipment, digital light processing (DLP) rapid prototyping systems, and computer numerically controlled (CNC) milling devices.

The fabrication machine control system 414 controls the operation of the rapid fabrication machine 412 to generate a physical part based on a received computer model. In some embodiments, the fabrication machine control system 414 converts a received computer model to a series of instructions for the fabrication machine control system 414.

The post-fabrication processing system 416 processes parts produced by the rapid fabrication machine 412. For example, the post-fabrication processing system 416 may include a post-cure UV oven that is used to treat parts that are fabricated in at least some embodiments.

Figure 8:
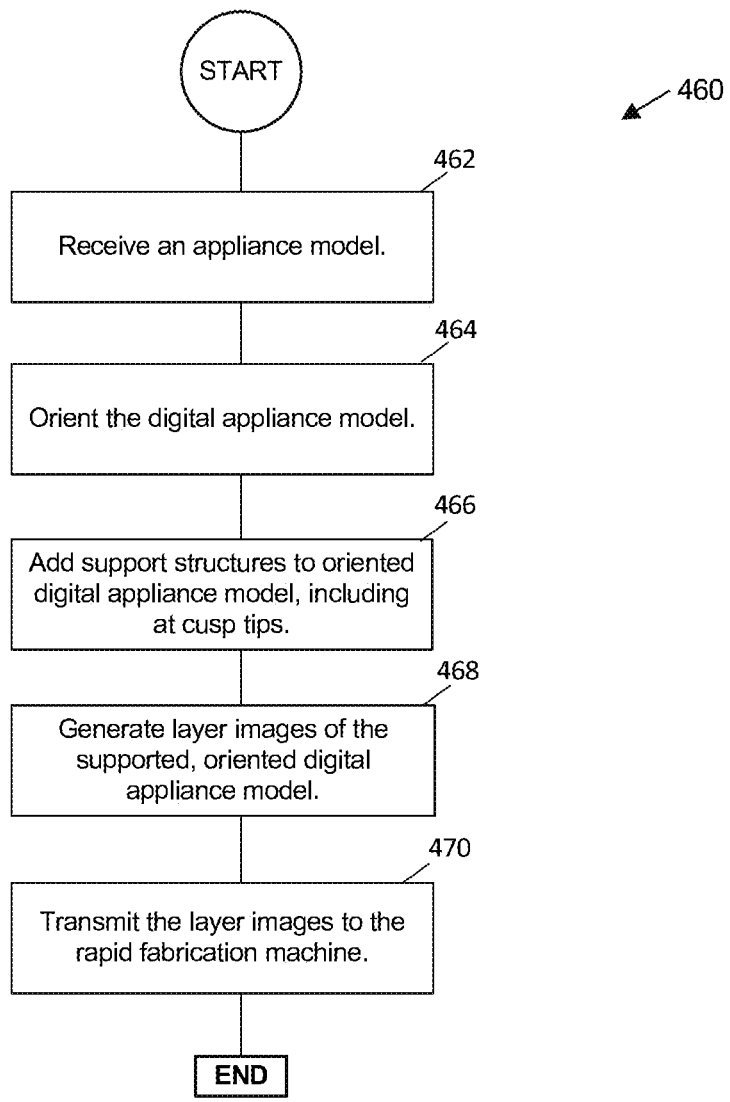
FIG. 8 is a schematic diagram of a method of controlling the fabrication of an appliance model performed by embodiments of the appliance fabrication system of FIG. 7.

FIG. 8 is a schematic diagram of a method 460 of controlling the fabrication of an appliance model. The method 460 is performed by embodiments of the fabrication machine control system 414.

At operation 462, an appliance model is received. For example, the appliance model may be received from the appliance design system.

At operation 464, the appliance model is oriented for fabrication. In some embodiments, the appliance model is oriented to minimize the height during fabrication. For example, the appliance model may be oriented so as to be approximately parallel with the occlusal surface of the model. In some embodiments, the appliance model is oriented so that the interior surface faces up.

At operation 466, support structures are added to the appliance model. The support structures may be added to provide support during the fabrication process. In some embodiments, the support structures are added at or near the location of cusp tips in the appliance model. In some embodiments, the support structures are added at locations corresponding to other structural elements of the appliance. Some embodiments also determine the location of support structures based on analyzing geometric properties of the appliance model.

At operation 468, layer images are generated for the supported, oriented appliance model. In some embodiments, the layer images are cross-sections of the appliance model generated by intersecting a horizontal plane with the appliance model at intervals corresponding to a layer depth that will be used in the fabrication. In some embodiments, the images are black and white. The portions of the cross-section that are within the appliance model are colored a first color (e.g., white) and the portions outside of the model are colored a second color (e.g., black). Some embodiments generate images using additional or different colors (e.g., to indicate support parts).

At operation 470, the layer images are transmitted to the rapid fabrication machine for fabrication. The layer images may be transmitted sequentially or in a group to the rapid fabrication machine. In some embodiments, additional instructions are transmitted to the rapid fabrication machine with the images.

Figure 9:
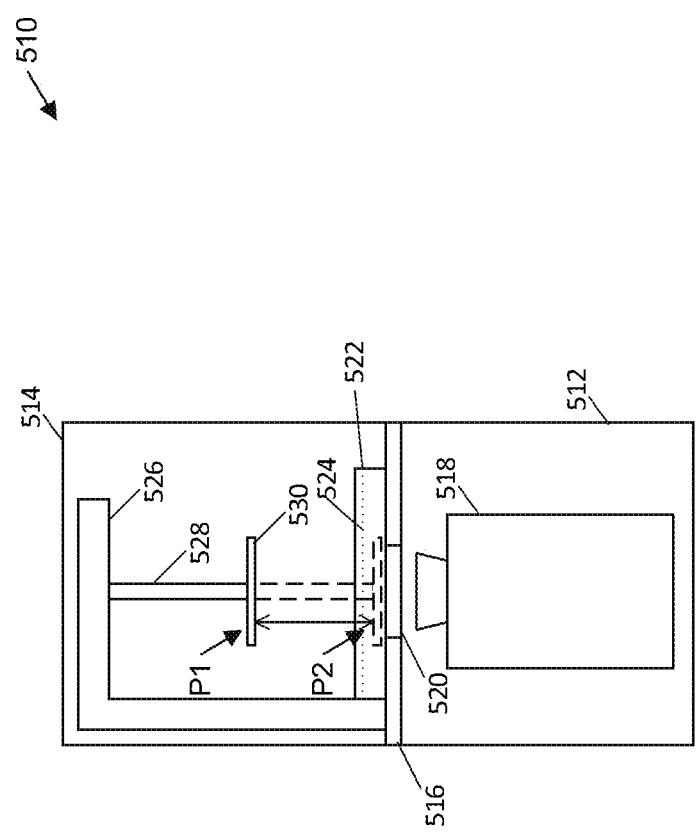
FIG. 9 is a schematic cross-sectional diagram of an example embodiment of the rapid fabrication (rapid prototyping) machine of FIG. 7.

FIG. 9 is a schematic cross-sectional diagram of an example rapid fabrication machine 510. The rapid fabrication machine 510 is an example of the rapid fabrication machine 412. In this example, the rapid fabrication machine 510 includes a lower housing 512 and an upper shielding structure 514 that are separated by a horizontal surface 516. The rapid fabrication machine 510 also includes a projector 518 disposed within the lower housing 512 and oriented to project images through a window 520 in the surface 516. In some embodiments, the projector 518 is a digital light projector that emits ultraviolet light. The window 520 may be formed from a transparent plastic material that allows the ultraviolet light emitted by the projector to pass. The upper shielding structure 514 may be formed from a plastic material that prevents passage of some or all of the ultraviolet light.

The window 520 may be formed of a material that is substantially chemically unreactive with the components of the polymer precursor solution, has a low or minimal degree of absorption and adsorption with respect to the components of the polymer precursor solution, and has a low or minimal degree of adhesion to the cured polymer. As used herein, the term "chemically unreactive" refers to a lack or limited amount of bond-forming interactions between the solution components and the window due to the thermodynamic and/or kinetic unfavorability of such reactions. The lack (or limited amount) of bond-forming and intermolecular reactions and low degree of adhesion to the cured polymer (e.g., a lack of intermolecular attractions) may facilitate easier removal of the cured polymer after each layer deposition. The window material is not particularly limited as long as it is UV transparent, chemically unreactive with the polymer precursor solution, and has low adhesion to the polymer, as described herein. In some embodiments, the transparent plastic material for forming the window 520 may be capable of allowing oxygen to diffuse into the polymer precursor solution, such that the oxygen is capable of acting as a polymerization inhibitor in the volume of solution directly adjacent (e.g., within a few microns) of the window, thereby reducing the time and force required to separate the printed layers from the window and improving printing speeds. Non-limiting examples of the substantially chemically unreactive plastic material may include polymethylpentene (for example, poly(4-methylpentene-1) manufactured as TPX™ by Mitsui Chemicals) and polytetrafluoroethylene (PTFE) (for example, Teflon™ AF 1600, 2400, and mixtures thereof, as manufactured by Chemours).

The rapid fabrication machine 510 also includes a reservoir 522 disposed above the window 520 and configured to contain a liquid build material 524. The rapid fabrication machine 510 also includes a support structure 526 that has movable arm 528 that raises and lowers a build surface 530.

For example, the movable arm 528 may move the build surface from an upper position P1 to a lower position P2.

During operation, the rapid fabrication machine 510 will repeatedly cause the movable arm 528 to move up and down within the liquid build material 524. For example, the build arm may move to a position in the liquid build material 524, leaving a thin layer of the liquid build material 524 below the build surface 530. An image is then projected by the projector 518 through the window 520. The ultraviolet light emitted by the projector 518 causes the thin layer of build material to cure into a solid that is attached to the build surface 530. The movable arm 524 then moves up, causing the build surface 530 to move away from the window 520 so that the cured solid separates from the surface of the window 520. Thereafter, the process is repeated with the movable arm 528 lowering the build surface 530 so as to leave a thin layer of the liquid build material 524 below the cured solid that is attached to the build surface 530. A new image can then be projected to add another layer to the cured solid. In some embodiments, during successive iterations, the movable arm 528 positions the build surface 530 at progressively higher positions during the lowering phase. These progressively higher positions may be offset by a layer thickness such as 50 or 100 microns. In at least some embodiment, there are no additional movements or motions (tipping or sliding) of the build surface 530 beside the raising and lowering. Beneficially, this build process is simpler and requires less mechanical components than build processes that require tilting of the build platform. In comparison to build processes that require tipping, sliding, or other additional movements to separate the solid part from the window 520, the process described herein may build a part more rapidly due to having fewer movements in the build process. In some embodiments, the aligner models are positioned or designed so as to allow separation from the window 520 with only up-and-down movements (i.e., in contrast to parts that require tilt or slide motions to separate from the build window).

Figure 10:
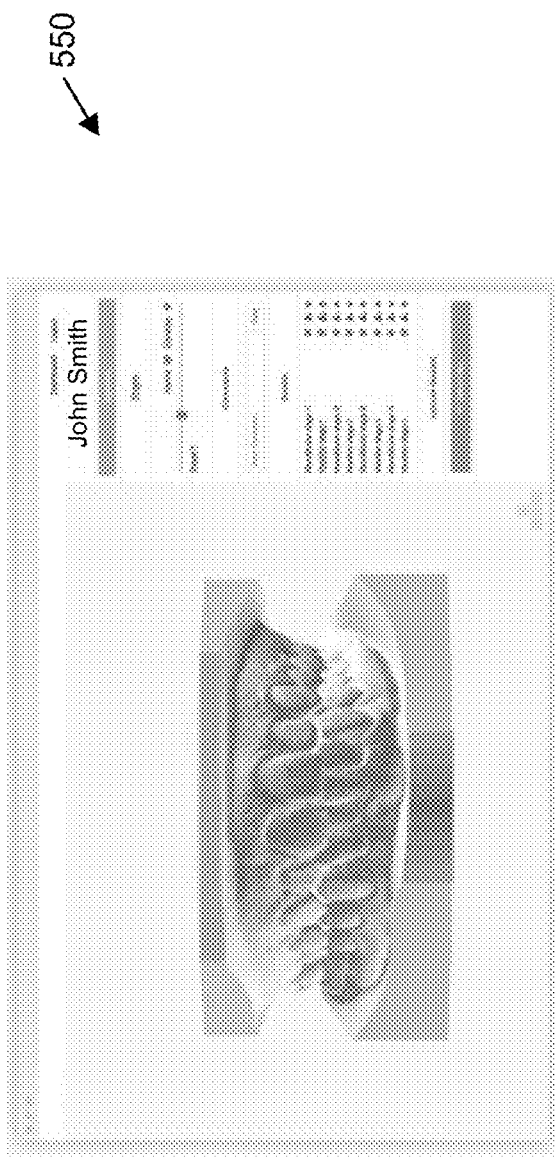
FIG. 10 shows an example user interface screen generated by some embodiments of the user interface engine of FIG. 3.

FIG. 10 shows an example user interface screen 550 generated by some embodiments of the user interface engine 188. In this example, a digital dental model is shown, such as the digital dental model 104. Additionally, the interface includes various information about the patient associated with the digital dental model and controls for interacting with and planning a treatment for the patient.

Figure 11:
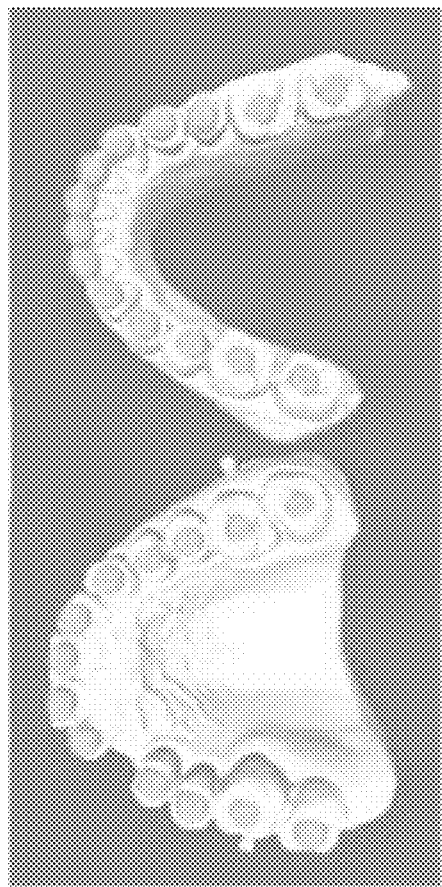
FIG. 11 shows an example user interface screen generated by some embodiments of the user interface engine of FIG. 3.

FIG. 11 shows an example user interface screen 590 generated by some embodiments of the user interface engine 188. In this example, a digital dental model is shown, such as the digital dental model 104. In this example, the model is split to show an occlusal view of both the upper and lower arch. Additionally, the interface includes tools for identifying the approximate location of teeth on the arch. These tools may be used in segmenting the digital dental model. For example, a user may be able to position the yellow spheres over each of the teeth by clicking, pointing, dragging, or other inputs.

Figure 12:
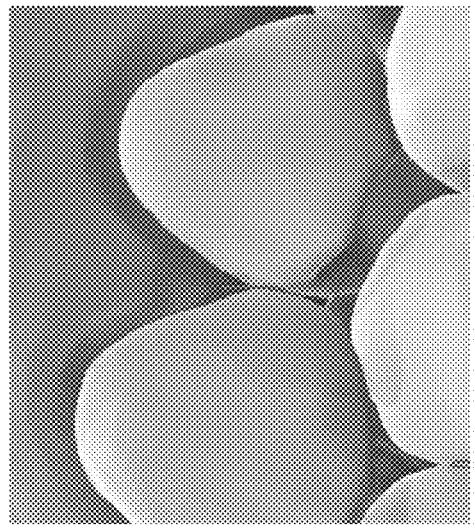
FIG. 12 shows an example user interface screen generated by some embodiments of the user interface engine of FIG. 3.

FIG. 12 shows an example user interface screen 630 generated by some embodiments of the user interface engine 188. In this example, an example of multiple component models generated from a digital dental model. In this example, the component models correspond to teeth segmented out of the digital dental model and the remainder of the digital dental model is shown as gum tissue. In this example, indicators (e.g., red lines) are shown in the interproximal regions to indicate where the model was segmented. In some embodiments, the user interface includes various tools to modify the segmentation of the model.

Figure 13B:
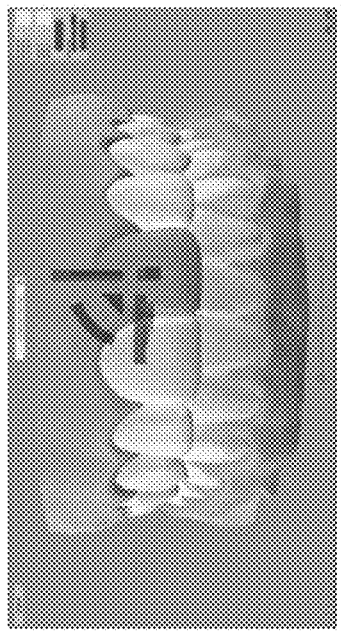
FIG. 13B shows an example user interface screen generated by some embodiments of the user interface engine of FIG. 3.
Figure 13A:
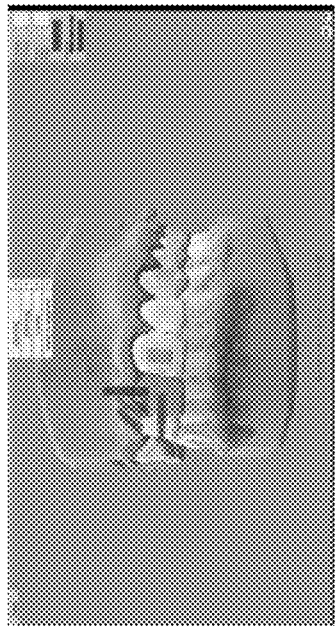
FIG. 13A shows an example user interface screen generated by some embodiments of the user interface engine of FIG. 3.

FIG. 13A shows an example user interface screen 670 and FIG. 13B shows an example user interface screen 710 generated by some embodiments of the user interface engine 188. In this example, a segmented model is shown and tools are provided for planning a treatment. In this example, an interface controls are shown to change the location and orientation of the component associated with the patient's upper central incisors are shown. FIG. 13A shows the tools with respect to the upper left central incisor and FIG. 13B shows the tools with respect to the upper right central incisor.

Figure 14:
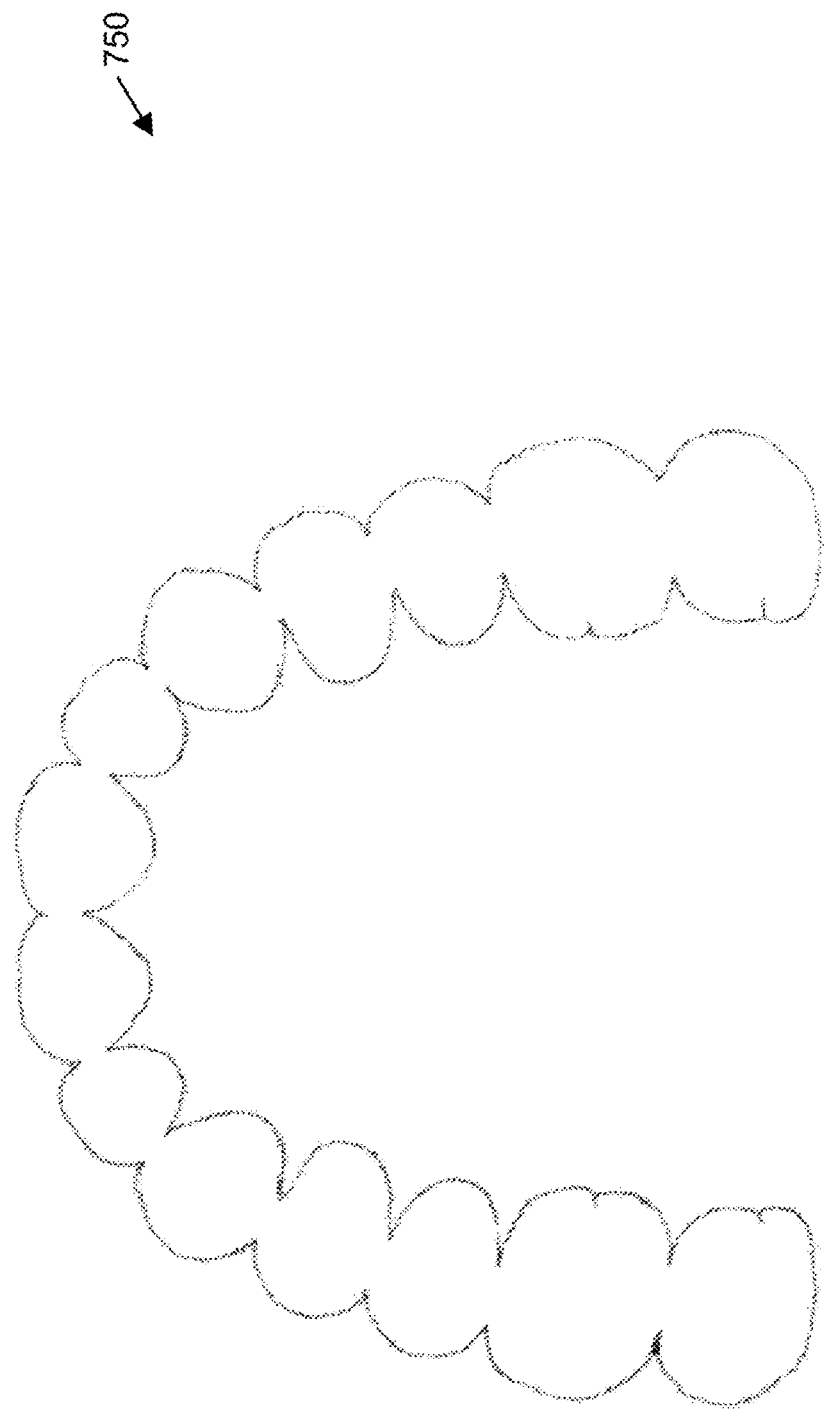
FIG. 14 is a schematic example of a dental appliance that may be fabricated by embodiments of the system of FIG. 1.

FIG. 14 is a schematic example of a dental appliance 750 that may be fabricated by embodiments of the system 100. In this example, the dental appliance 750 is an orthodontic aligner. In some embodiments, the dental appliance 750 includes a thin shell that is shaped to fit over the patient's dentition.

Figure 15:
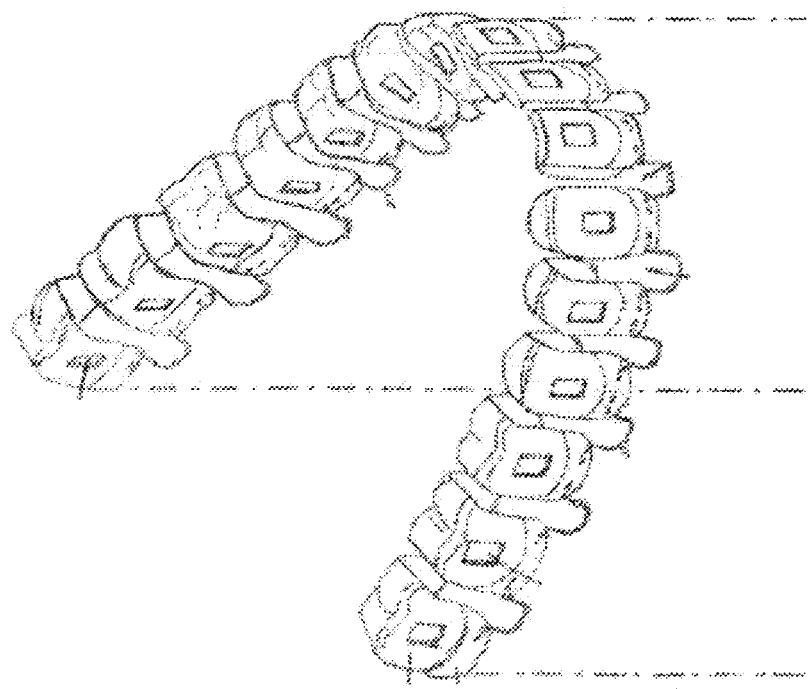
FIG. 15 is a schematic example of a dental appliance that may be fabricated by embodiments of the system of FIG. 1

FIG. 15 is a schematic example of a dental appliance 790 that may be fabricated by embodiments of the system 100. In this example, the dental appliance 790 is an orthodontic aligner that has separate thin shell portions that are connected by loops. In some embodiments, the loops are biased away from the patient's gum tissue. In some embodiments, the amount of bias is determined based on the nature of the movement urged by the appliance (e.g., if a tooth is being torqued, the loop may be biased further away from the gum tissue to avoid painfully impinging on the tissue). The thin shell portions also include apertures to fit over bonded attachments.

Figure 16:
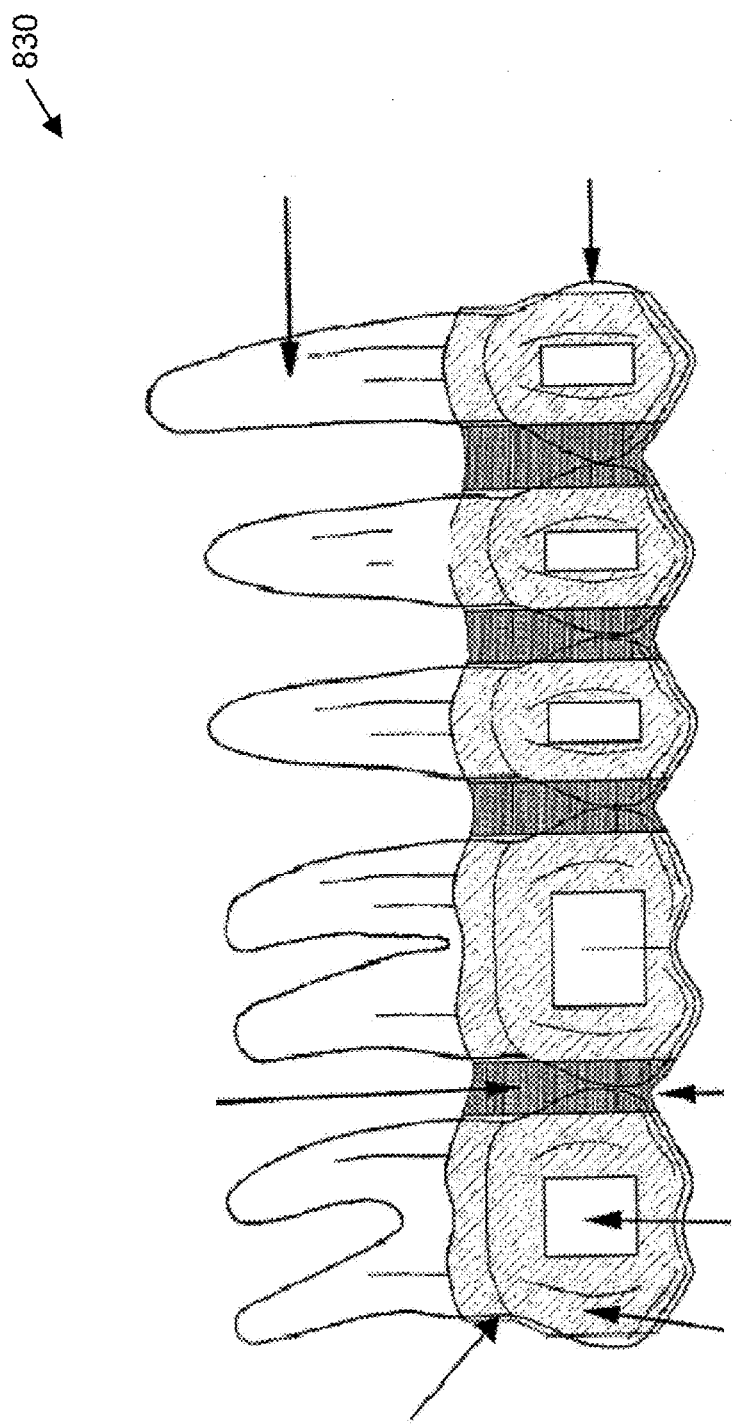
FIG. 16 is a schematic example of a dental appliance that may be fabricated by embodiments of the system of FIG. 1

FIG. 16 is a schematic example of a dental appliance 830 that may be fabricated by embodiments of the system 100. In this example, the dental appliance 830 is an orthodontic aligner that includes solid thin shell portions and patterned thin shell portions. The patterned thin shell portions are shown with darker shading and may allow for greater flexibility in one or more directions.

Figure 17B:
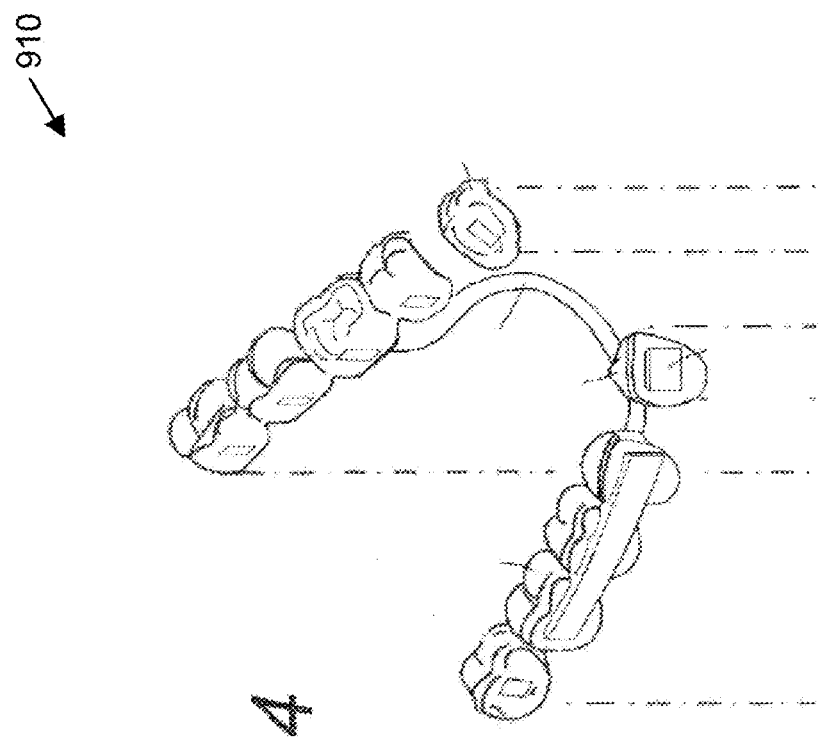
FIG. 17B is a schematic example of a dental appliance component that may be fabricated by embodiments of the system of FIG. 1.
Figure 17A:
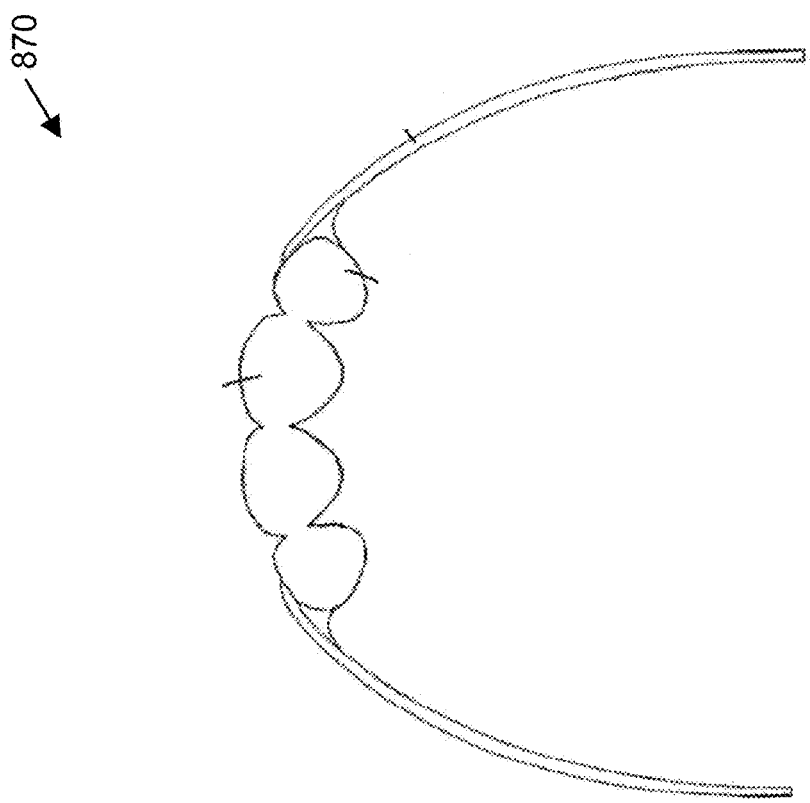
FIG. 17A is a schematic example of a dental appliance component that may be fabricated by embodiments of the system of FIG. 1

FIG. 17A is a schematic example of a dental appliance component 870 that may be fabricated by embodiments of the system 100. FIG. 17B is a schematic example of a dental appliance component 910 that may be fabricated by embodiments of the system 100. In this example, the dental appliance component 870 includes tabs that extend in the posterior direction and are configured to mate with slots of the dental appliance component 910. This tab-and-slot arrangement can be used to close gaps in the patient's dentition.

Figure 18:
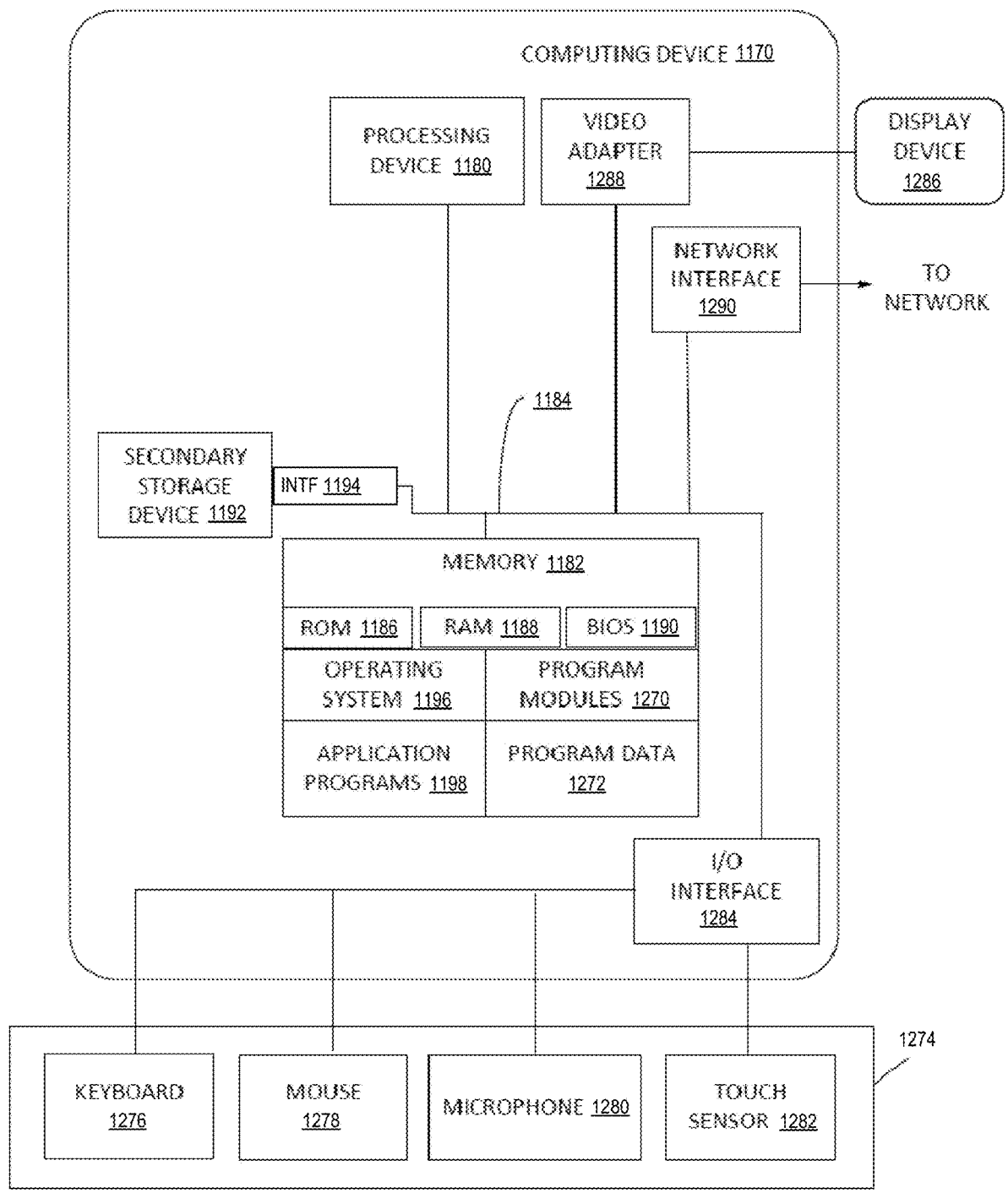
FIG. 18 shows an example of a computer device that can be used to implement the techniques described here.

FIG. 18 illustrates an example architecture of a computing device 1170 that can be used to implement aspects of the present disclosure, including any of the plurality of computing devices described herein, such as a computing device of the impression system 102, appliance design system 106, appliance fabrication system 112, or any other computing devices that may be utilized in the various possible embodiments.

The computing device illustrated in FIG. 18 can be used to execute the operating system, application programs, and software modules (including the software engines) described herein.

The computing device 1170 includes, in some embodiments, at least one processing device 1180, such as a central processing unit (CPU). A variety of processing devices are available from a variety of manufacturers, for example, Intel or Advanced Micro Devices. In this example, the computing device 1170 also includes a system memory 1182, and a system bus 1184 that couples various system components including the system memory 1182 to the processing device 1180. The system bus 1184 is one of any number of types of bus structures including a memory bus, or memory controller; a peripheral bus; and a local bus using any of a variety of bus architectures.

Examples of computing devices suitable for the computing device 1170 include a desktop computer, a laptop computer, a tablet computer, a mobile computing device (such as a smart phone, an iPod® or iPad® mobile digital device, or other mobile devices), or other devices configured to process digital instructions.

The system memory 1182 includes read only memory 1186 and random access memory 1188. A basic input/output system 1190 containing the basic routines that act to transfer information within computing device 1170, such as during start up, is typically stored in the read only memory 1186.

The computing device 1170 also includes a secondary storage device 1192 in some embodiments, such as a hard disk drive, for storing digital data. The secondary storage device 1192 is connected to the system bus 1184 by a secondary storage interface 1194. The secondary storage devices 1192 and their associated computer readable media provide nonvolatile storage of computer readable instructions (including application programs and program modules), data structures, and other data for the computing device 1170.

Although the exemplary environment described herein employs a hard disk drive as a secondary storage device, other types of computer readable storage media are used in other embodiments. Examples of these other types of computer readable storage media include magnetic cassettes, flash memory cards, digital video disks, Bernoulli cartridges, compact disc read only memories, digital versatile disk read only memories, random access memories, or read only memories. Some embodiments include non-transitory media. Additionally, such computer readable storage media can include local storage or cloud-based storage.

A number of program modules can be stored in secondary storage device 1192 or system memory 1182, including an operating system 1196, one or more application programs 1198, other program modules 1270 (such as the software engines described herein), and program data 1272. The computing device 1170 can utilize any suitable operating system, such as Microsoft Windows™, Google Chrome™ OS, Apple OS, Unix, or Linux and variants and any other operating system suitable for a computing device. Other examples can include Microsoft, Google, or Apple operating systems, or any other suitable operating system used in tablet computing devices.

In some embodiments, a user provides inputs to the computing device 1170 through one or more input devices 1274. Examples of input devices 1274 include a keyboard 1276, mouse 1278, microphone 1280, and touch sensor 1282 (such as a touchpad or touch sensitive display). Other embodiments include other input devices 1274. The input devices are often connected to the processing device 1180 through an input/output interface 1284 that is coupled to the system bus 1184. These input devices 1274 can be connected by any number of input/output interfaces, such as a parallel port, serial port, game port, or a universal serial bus. Wireless communication between input devices and the interface 1284 is possible as well, and includes infrared, BLUETOOTH® wireless technology, 802.11a/b/g/n, cellular, ultra-wideband (UWB), ZigBee, or other radio frequency communication systems in some possible embodiments.

In this example embodiment, a display device 1286, such as a monitor, liquid crystal display device, projector, or touch sensitive display device, is also connected to the system bus 1184 via an interface, such as a video adapter 1288. In addition to the display device 1286, the computing device 1170 can include various other peripheral devices (not shown), such as speakers or a printer.

When used in a local area networking environment or a wide area networking environment (such as the Internet), the computing device 1170 is typically connected to the network through a network interface 1290, such as an Ethernet interface. Other possible embodiments use other communication devices. For example, some embodiments of the computing device 1170 include a modem for communicating across the network.

The computing device 1170 typically includes at least some form of computer readable media. Computer readable media includes any available media that can be accessed by the computing device 1170. By way of example, computer readable media include computer readable storage media and computer readable communication media.

Computer readable storage media includes volatile and nonvolatile, removable and non-removable media implemented in any device configured to store information such as computer readable instructions, data structures, program modules or other data. Computer readable storage media includes, but is not limited to, random access memory, read only memory, electrically erasable programmable read only memory, flash memory or other memory technology, compact disc read only memory, digital versatile disks or other optical storage, magnetic cassettes, magnetic tape, magnetic disk storage or other magnetic storage devices, or any other medium that can be used to store the desired information and that can be accessed by the computing device 1170.

Computer readable communication media typically embodies computer readable instructions, data structures, program modules or other data in a modulated data signal such as a carrier wave or other transport mechanism and includes any information delivery media. The term "modulated data signal" refers to a signal that has one or more of its characteristics set or changed in such a manner as to encode information in the signal. By way of example, computer readable communication media includes wired media such as a wired network or direct-wired connection, and wireless media such as acoustic, radio frequency, infrared, and other wireless media. Combinations of any of the above are also included within the scope of computer readable media.

The computing device illustrated in FIG. 18 is also an example of programmable electronics, which may include one or more such computing devices, and when multiple computing devices are included, such computing devices can be coupled together with a suitable data communication network so as to collectively perform the various functions, methods, or operations disclosed herein.

According to one or more embodiments of the present disclosure, a method of fabricating an orthodontic appliance (e.g., an orthodontic aligner) includes: providing a polymer precursor solution to a rapid fabrication machine, and fabricating the orthodontic aligner according to an appliance model.

The polymer precursor solution may be the same as described herein in connection with the orthodontic aligner. In some embodiments, for example, the polymer precursor solution may include a monomer or oligomer, a UV-activated catalyst, and a blocking agent. The amounts of the monomer or oligomer, catalyst, and blocking agent may be the same as described herein in connection with the orthodontic aligner. In some embodiments, the polymer precursor solution may form an olefin polymer such that the orthodontic appliance is formed of an olefin polymer.

In some embodiments, the olefin polymer may be formed by ring-opening metathesis polymerization (ROMP). For example, the polymer precursor solution may be selected or configured to form a polymer via ROMP. In some embodiments, the olefin polymer may be formed by UV-activated ROMP or PLOMP. In some embodiments, the catalyst may be a Grubbs-type UV-activated olefin metathesis catalyst. In some embodiments, when the catalyst is a Grubbs-type UV-activated olefin metathesis catalyst, UV-activation may be controlled by using an olefin-containing quencher, as described herein. In some embodiments, the olefin-containing quencher may have a structure represented by Formula 1, and for example, may be ethyl vinyl ether.

In some embodiments, when the polymer precursor solution is configured to form a polymer via ROMP (e.g., UV-activated ROMP), the monomer or oligomer may include a mixture of 1,5-cyclooctadiene (COD) and 5-ethylidene-2-norbornene. In some embodiments, the monomer or oligomer may include a mixture of COD and dicyclopentadiene. In some embodiments, the monomer or oligomer may include COD, dicyclopentadiene, 5-ethylidene-2-norbornene, or any mixture thereof. For example, the monomer or oligomer may include any one of COD, dicyclopentadiene, and 5-ethylidene-2-norbornene by itself.

The reaction conditions for forming the olefin polymer and/or olefin polymer precursor solution may be the same as described herein, for example, with respect to the reactants, reaction times, atmosphere, solvent, and conditions.

Fabricating the orthodontic aligner according to an appliance model may be the same as described herein in connection with methods 140, 230, 290, 340, and 460. For example, the rapid fabrication machine may be a 3D printer, CNC milling device, or stereolithography system as described herein in connection with elements 112 and 510. The appliance model may be the same as described herein in connection with element 110.

Furthermore, in some embodiments, the appliance model may be designed according to U.S. patent application Ser. No. 14/566,474, titled "Tooth positioning appliance with curved interconnecting elements"; U.S. patent application Ser. No. 14/645,622, titled "Tooth-positioning appliance for closing spaces"; and U.S. patent application Ser. No. 15/260,026, titled "Tooth-positioning appliance, systems and methods of producing and using the same"; the entire content of each of which is incorporated herein by reference. The use of a dental-compatible olefin polymer to fabricate an orthodontic aligner according to embodiments of the present disclosure in conjunction with the designs and structural features described according to these disclosures provides orthodontic aligners having improved material properties and efficacy.

Additionally, in some embodiments of the present disclosure, an additive manufacturing method uses the olefin polymer(s) described herein to produce non-dental devices and/or appliances. For example, while the above description details methods of additive manufacturing using the described polymer(s) for producing dental devices and appliances, the additive manufacturing method may employ the described polymer precursor solution(s) to selectively form the olefin polymer in any desired shape to produce a device and/or appliance for any purpose (dental or otherwise). According to some embodiments, such methods employ a polymer precursor solution that includes one or more of the blocking agents, UV absorbing agents, quenching agents, etc., as described herein in order to enable rapid prototyping via, e.g., lithography or 3D printing, as also described herein. The reaction conditions (e.g., reactants, reaction times, atmosphere, solvent, and conditions) for forming the olefin polymer and/or olefin polymer precursor solution used for such general additive manufacturing may be similar to those described above, for example, with respect to the method of fabricating the orthodontic appliances described herein. The blocking agent or UV absorbing agent may also be the same as described above.

The following Example is provided for illustrative purposes only, and does not limit the scope of the embodiments of the present invention.

EXAMPLE 1

A polymer precursor solution is prepared under non-oxygen containing atmosphere conditions by mixing COD and a Grubbs-type catalyst, allowing the COD to polymerize for about 5 seconds to about 1 minute, and then adding ethyl vinyl ether to the mixture in order to convert the catalyst into a UV-activated catalyst. After sonicating the initial COD-derived polymer and removing volatile side products under vacuum, the resulting reaction composition is dissolved in 5-ethylidene-2-norbornene. The reaction composition is further mixed with a blocking agent to yield the polymer precursor solution, which is then placed in a rapid prototyping machine. The polymer precursor solution is irradiated with UV light within the rapid prototyping machine to directly fabricate a series of 2D cross-sections of a 3D virtual appliance, thereby producing a 3D orthodontic aligner.

A number of embodiments have been described. Nevertheless, it will be understood that various modifications may be made without departing from the spirit and scope of the invention, and equivalents thereof, as defined in the claims that follow this description. For example, although certain components may have been described in the singular, i.e., "a" polymer, "an" aligner, and the like, one or more of these components in any combination can be used according to the present disclosure.

In addition, the logic flows depicted in the figures do not require the particular order shown, or sequential order, to achieve desirable results. In addition, other steps may be provided, or steps may be eliminated, from the described flows, and other components may be added to, or removed from, the described systems.

Also, although certain embodiments have been described as "comprising" or "including" the specified components, embodiments "consisting essentially of" or "consisting of" the listed components are also within the scope of this disclosure. For example, while embodiments of the present invention are described as comprising providing a polymer precursor solution to a rapid fabrication machine, and fabricating the orthodontic aligner according to an appliance model, embodiments consisting essentially of or consisting of these actions are also within the scope of this disclosure. Accordingly, a method of fabricating an orthodontic aligner may consist essentially of: providing a polymer precursor solution to a rapid fabrication machine, and fabricating the orthodontic aligner according to an appliance model. In this context, "consisting essentially of" means that any additional components or process actions will not materially affect the properties or performance of the product produced by the method.

As used herein, unless otherwise expressly specified, all numbers such as those expressing values, ranges, amounts or percentages may be read as if prefaced by the word "about", even if the term does not expressly appear. Further, the word "about" is used as a term of approximation, and not as a term of degree, and reflects the penumbra of variation associated with measurement, significant figures, and interchangeability, all as understood by a person having ordinary skill in the art to which this disclosure pertains. Any numerical range recited herein is intended to include all sub-ranges subsumed therein. Plural encompasses singular and vice versa. For example, while the present disclosure may describe "a" monomer or "an" oligomer, a mixture of such monomers or oligomers can be used. When ranges are given, any endpoints of those ranges and/or numbers within those ranges can be combined within the scope of the present disclosure. The terms "including" and like terms mean "including but not limited to," unless specified to the contrary. Further, as used herein, the terms "substantially" and "nearly" are used as terms of approximation and not as terms of degree, and are intended to account for normal variations and deviations in the measurement or assessment of various parameters of the complexes and compositions (e.g., in the description of physical or chemical properties of various components and in the description of amounts of various components).

Notwithstanding that the numerical ranges and parameters set forth herein may be approximations, numerical values set forth in the Examples are reported as precisely as is practical. Any numerical value, however, inherently contains certain errors necessarily resulting from the standard variation found in their respective testing measurements.

The word "comprising" and variations thereof as used in this description and in the claims do not limit the disclosure to exclude any variants or additions.

What is claimed is:

1. A method of fabricating an orthodontic aligner, the method comprising:
   providing an olefin polymer precursor solution to a stereolithography or digital light processing machine, the olefin polymer precursor solution comprising a monomer or oligomer, a catalyst, an olefin-containing quenching agent, and a separate UV absorbing agent, one or more reactions of the polymer precursor solution being modulated in response to UV light; and
   fabricating the orthodontic aligner using the stereolithography or digital light processing machine according to an appliance model such that stereolithography or digital light processing of the olefin polymer precursor solution produces the orthodontic aligner comprising an olefin polymer having a stress resistance of at least about 5,000 psi and an elongation at break of about 6% to about 200%.

2. The method of claim 1, wherein the olefin polymer precursor solution is configured to form an olefin polymer via ring opening metathesis polymerization (ROMP).

3. The method of claim 2, wherein the monomer or oligomer comprises 1,5-cyclooctadiene, dicyclopentadiene, 5-ethylidene-2-norbornene, or a mixture thereof.

* * * * *